(12) United States Patent
Guo et al.

(10) Patent No.: US 12,149,368 B2
(45) Date of Patent: Nov. 19, 2024

(54) USER DEVICES, WIRELESS COMMUNICATION METHODS, AND COMPUTER READABLE STORAGE MEDIUM

(71) Applicant: Sony Group Corporation, Tokyo (JP)

(72) Inventors: Xin Guo, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 252 days.

(21) Appl. No.: 17/288,150

(22) PCT Filed: Oct. 25, 2019

(86) PCT No.: PCT/CN2019/113183
§ 371 (c)(1),
(2) Date: Apr. 23, 2021

(87) PCT Pub. No.: WO2020/088354
PCT Pub. Date: May 7, 2020

(65) Prior Publication Data
US 2021/0385029 A1 Dec. 9, 2021

(30) Foreign Application Priority Data
Nov. 2, 2018 (CN) .......................... 201811301056.5

(51) Int. Cl.
*H04L 1/1867* (2023.01)
*H04J 13/16* (2011.01)
(Continued)

(52) U.S. Cl.
CPC ............ *H04L 1/1896* (2013.01); *H04J 13/16* (2013.01); *H04L 5/0082* (2013.01);
(Continued)

(58) Field of Classification Search
None
See application file for complete search history.

(56) References Cited

U.S. PATENT DOCUMENTS

2016/0373915 A1 12/2016 Kim
2017/0215183 A1 7/2017 Gulati
(Continued)

FOREIGN PATENT DOCUMENTS

CN 102098140 A 6/2011
CN 102144414 A 8/2011
(Continued)

OTHER PUBLICATIONS

Huawei et al: "Feedback information for sidelink link adaptation", 3GPP Draft; RI-1712136, 3rd Generation Partnership Project (3GPP), vol. RAN WGI, Aug. 20, 2017 (Aug. 20, 2017), XP051314956, Retrieved from the Internet: URL:http://www.3gpp.org/ftp/Meetings_3GPP_ SYNC/RANI/Docs/.
(Continued)

*Primary Examiner* — Saumit Shah
(74) *Attorney, Agent, or Firm* — XSENSUS LLP

(57) ABSTRACT

The present disclosure relates to user devices, wireless communication methods, and a computer readable storage medium. A user device serving as a transmitting end according to the present disclosure comprises a processing circuit and is configured to: send a message to a receiving end device by means of a sidelink; and receive feedback information indicating the message receiving state of the receiving end device, the feedback information comprising only one of ACK and NACK. The user devices, wireless communication methods, and computer readable storage medium according to the present disclosure can be used to
(Continued)

rationally design HARQ technology for a sidelink, so as to satisfy the requirements of reliability of sidelink communication for different services.

20 Claims, 12 Drawing Sheets

(51) Int. Cl.
*H04L 5/00* (2006.01)
*H04W 72/0453* (2023.01)
*H04W 72/1263* (2023.01)
*H04W 72/20* (2023.01)

(52) U.S. Cl.
CPC ... *H04W 72/0453* (2013.01); *H04W 72/1263* (2013.01); *H04W 72/20* (2023.01)

(56) References Cited

U.S. PATENT DOCUMENTS

| | | | |
|---|---|---|---|
| 2017/0264395 A1 | 9/2017 | Wakabayashi | |
| 2017/0347394 A1 | 11/2017 | Yasukawa | |
| 2018/0035427 A1 | 2/2018 | Gupta | |
| 2018/0270022 A1 | 9/2018 | Sun | |
| 2018/0287744 A1 | 10/2018 | Sundararajan | |
| 2019/0150122 A1* | 5/2019 | Ying | H04W 72/23 370/329 |
| 2019/0190659 A1* | 6/2019 | Tang | H04L 5/0005 |
| 2019/0335480 A1* | 10/2019 | Sun | H04W 72/23 |
| 2019/0364588 A1* | 11/2019 | Lu | H04L 1/1887 |
| 2020/0137536 A1* | 4/2020 | Nguyen | H04L 27/2607 |
| 2021/0007020 A1* | 1/2021 | Jiang | H04L 5/0051 |
| 2021/0029675 A1* | 1/2021 | Ji | H04L 1/1896 |
| 2021/0075561 A1* | 3/2021 | Baldemair | H04L 1/1614 |
| 2021/0219320 A1* | 7/2021 | Belleschi | H04W 72/20 |
| 2021/0243841 A1* | 8/2021 | Yasukawa | H04W 28/04 |

FOREIGN PATENT DOCUMENTS

| | | |
|---|---|---|
| CN | 103138898 A | 6/2013 |
| CN | 105191459 A | 12/2015 |
| CN | 105472744 A | 4/2016 |
| CN | 106465224 A | 2/2017 |
| CN | 107896121 A | 4/2018 |
| CN | 104601304 B | 9/2018 |
| EP | 1973255 A1 | 9/2008 |
| EP | 3 128 797 A1 | 2/2017 |
| EP | 3349526 A1 | 7/2018 |
| TW | 201804744 A | 2/2018 |
| WO | WO-2016076301 A | 5/2016 |
| WO | WO-2018018478 A1 | 2/2018 |
| WO | 2018080151 A1 | 5/2018 |
| WO | WO-2018164495 A1 | 9/2018 |
| WO | WO-2018185638 A1 | 10/2018 |
| WO | WO-2018201005 A1 | 11/2018 |

OTHER PUBLICATIONS

Intel Corporation: "Discussion on Conflict/Collision-Free Sidelink UE-to-NW Relaying for Wearable and IoT Use Cases", 3GPP Draft; RI-1712517, 3rd Generation Partnership Project (3GPP), vol. RAN WGI, Aug. 20, 2017 (Aug. 20, 2017), XP051315333, Retrieved from the Internet: URL:http://www.3gpp.org/ftp/Meetings_3GPP_SYNC/RANI/Docs/.

Lenovo et al:"Sidelink feedback information ", 3GPP Draft; RI-1707773, 3rd Generation Partnership Project (3GPP), vol. RAN WGI, No. Hangzhou; May 14, 2017 (May 14, 2017), XP051272976, Retrieved from the Internet: URL:http://www.3gpp.org/ftp/Meetings_3GPP_SYNC/RANI/Docs/.

Panasonic: "Discussion on sidelink feedback in FeD2D", 3GPP Draft; RI-1713856, 3rd Generation Partnership Project (3GPP), vol. RAN WGI, Aug. 20, 2017 (Aug. 20, 2017), XP051316650, Retrieved from the Internet: URL:http://www.3gpp.org/ftp/Meetings_3GPP_SYNC/RANI/Docs/.

Xiaomi Communications:"On support of HARQ for V2x communications", 3GPP Draft; RI-1811420, 3rd Generation Partnership Project (3GPP), vol. RAN WGI, Sep. 28, 2018 XP051518824, Retrieved from the Internet: URL:http://www.3gpp.org/ftp/tsg%5Fran/WG1%_5_FRL1/TSGR1%5F94b/Docs/R1%2D1811420%2Ezi.

International Search Report and Written Opinion mailed on Jan. 19, 2020, received for PCT Application PCT/CN2019/113183, Filed on Oct. 25, 2019, 10 pages including English Translation.

ITL. "Discussion on NR V2X HARQ mechanism", 3GPP TSG RAN WG1 #94 bis R1-1811615, Internet<URL: http://www.3gpp.org/ftp/tsg_ran/WG1_RL1/TSG, R1_94b/Docs/R1-1811615.zip>, Sep. 29, 2018.

* cited by examiner

|  | Time slot #n-3 | Time slot #n-2 | Time slot #n-1 |
|---|---|---|---|
| Carrier #1 | - | A/N | A/N |
| Carrier #2 | A/N | - | A/N |
| Carrier #3 | - | A/N | - |

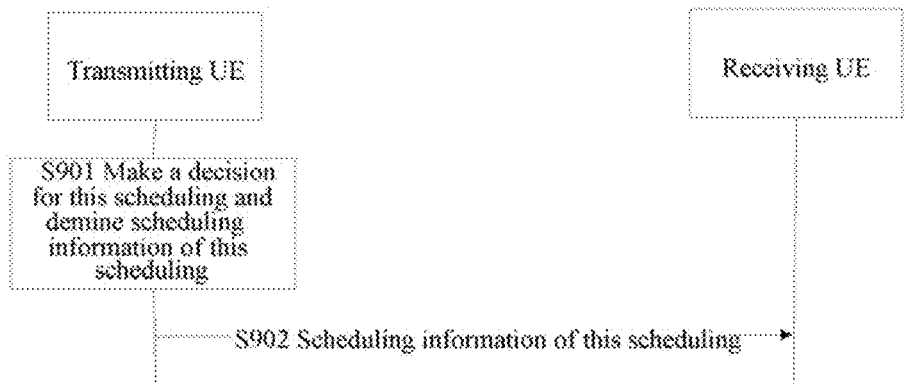
Figure 8
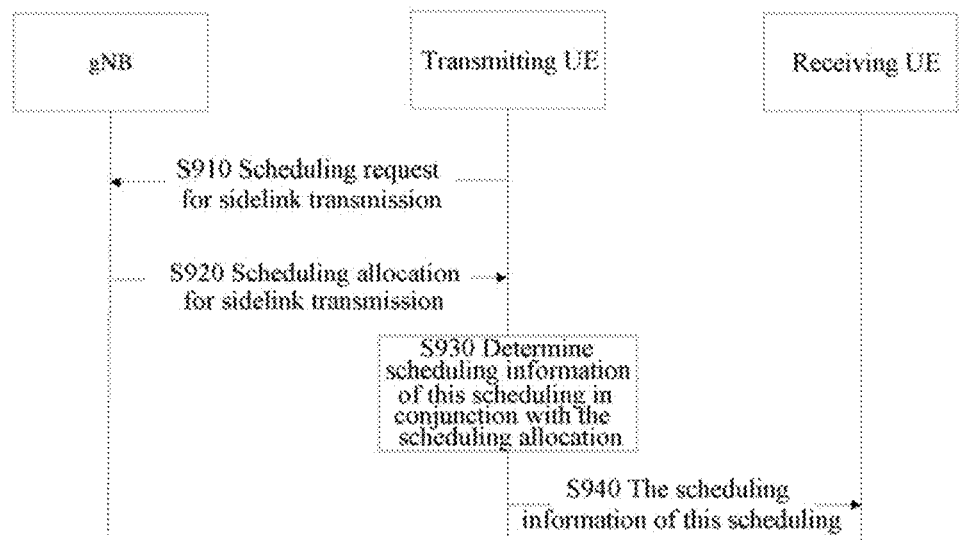
Figure 9 (a)
Figure 9 (b)

USER DEVICES, WIRELESS COMMUNICATION METHODS, AND COMPUTER READABLE STORAGE MEDIUM

CROSS-REFERENCE TO RELATED APPLICATIONS

The present application is based on PCT filing PCT/CN2019/113183, filed Oct. 25, 2019, which claims priority to Chinese Patent Application No. 201811301056.5, titled "USER EQUIPMENTS, WIRELESS COMMUNICATION METHODS, AND COMPUTER READABLE STORAGE MEDIUM", filed on Nov. 2, 2018 with the Chinese Patent Office, each of which are incorporated herein by reference in its entirety.

FIELD

The embodiments of the present disclosure generally relates to the field of wireless communication, and in particular to user equipments, wireless communication methods and a computer readable storage medium. More particularly, the present disclosure relates to a user equipment as a transmitting end of sidelink communication, a user equipment as a receiving end of sidelink communication, a wireless communication method performed by the user equipment as a transmitting end of sidelink communication, a wireless communication method performed by the user equipment as a receiving end of sidelink communication, and a computer readable storage medium.

BACKGROUND

With the explosive growth of user data, requirements for data transmission rate and data transmission efficiency are increased. A load of communication between a user and a base station is constantly increasing. In such background, two cellular communication user equipments may transmit information to each other through a sidelink between the two user equipments.

HARQ (Hybrid Automatic Repeat Request) technology is formed by combining a forward error correction (FEC) technology with an automatic retransmission query (ARQ) technology and is used in communication between a network side equipment and a user equipment. A receiver transmits ACK information to a transmitter in a case that the receiver succeeds in decoding. In a case that the receiver fails to decode, the receiver may save received data and transmit NACK information to the transmitter, and thus request the transmitter to repeatedly transmit the data. The receiver merges the repeatedly transmitted data with the previously received data before decoding. In this way, a diversity gain can be formed, thereby reducing the number of times of repeated transmissions and reducing a delay.

However, a sidelink in a vehicle network is used mainly for a service related to road safety. Therefore, only a method in which the transmitter performs active repeated transmission is adopted to ensure reliability of the service. With the gradual increase of the type and the number of sidelink communication services, distribution density of related user equipments increases. The method in which the transmitter performs active repeated transmission cannot ensure reliability of the service, especially considering that some new services have high reliability requirements.

Therefore, it is required to provide a technical solution to properly design the HARQ technology for a sidelink, so as to meet reliability of sidelink communication for various services.

SUMMARY

The summary part provides a general summary of the present disclosure, rather than a comprehensive disclosure of a full scope or all features of the present disclosure.

An object of the present disclosure is to provide a user equipment, a wireless communication method and a computer readable storage medium to properly design the HARQ technology for a sidelink, so as to meet reliability of sidelink communication for various services.

According to an aspect of the present disclosure, a user equipment as a transmitting end is provided. The user equipment includes processing circuitry. The processing circuitry is configured to: transmit a message to a receiving end equipment through a sidelink, and receive feedback information representing a receiving status of the receiving end equipment with respect to the message. The feedback information includes only one of ACK and NACK.

According to another aspect of the present disclosure, a user equipment as a receiving end is provided. The user equipment includes processing circuitry. The processing circuitry is configured to: receive a message from a transmitting end equipment through a sidelink, and transmit feedback information representing a receiving status of the user equipment with respect to the message. The feedback information includes only one of ACK and NACK.

According to another aspect of the present disclosure, a user equipment as a transmitting end is provided. The user equipment includes processing circuitry. The processing circuitry is configured to: transmit a message to a receiving end equipment through a sidelink; and receive, from other equipment than the receiving end equipment, feedback information representing a receiving status of the receiving end equipment with respect to the message, or receive, from the receiving end equipment, feedback information representing a receiving status of the receiving end equipment with respect to the message for multiple times.

According to another aspect of the present disclosure, a user equipment as a receiving end is provided. The user equipment includes processing circuitry. The processing circuitry is configured to: receive a message from a transmitting end equipment through a sidelink; and transmit, to other equipment than the transmitting end equipment, feedback information representing a receiving status of the user equipment with respect to the message, or transmit, to the transmitting end equipment, feedback information representing a receiving status of the user equipment with respect to the message for multiple times.

According to another aspect of the present disclosure, a wireless communication method performed by a user equipment as a transmitting end is provided. The wireless communication method includes: transmitting a message to a receiving end equipment through a sidelink; and receiving feedback information representing a receiving status of the receiving end equipment with respect to the message. The feedback information includes only one of ACK and NACK.

According to another aspect of the present disclosure, a wireless communication method performed by a user equipment as a receiving end is provided. The wireless communication method includes: receiving a message from a transmitting end equipment through a sidelink; and transmitting feedback information representing a receiving status of the user equipment with respect to the message. The feedback information includes only one of ACK and NACK.

According to another aspect of the present disclosure, a wireless communication method performed by a user equipment as a transmitting end is provided. The wireless communication method includes: transmitting a message to a receiving end equipment through a sidelink; and receiving, from other equipment than the receiving end equipment, feedback information representing a receiving status of the receiving end equipment with respect to the message, or receiving, from the receiving end equipment, feedback information representing a receiving status of the receiving end equipment with respect to the message for multiple times.

According to another aspect of the present disclosure, a wireless communication method performed by a user equipment as a receiving end is provided. The wireless communication method includes: receiving a message from a transmitting end equipment through a sidelink; and transmitting, to other equipment than the transmitting end equipment, feedback information representing a receiving status of the user equipment with respect to the message, or transmitting, to the transmitting end equipment, feedback information representing a receiving status of the user equipment with respect to the message for multiple times.

According to another aspect of the present disclosure, a computer readable storage medium is provided. The computer readable storage medium includes executable computer instructions that, when executed by a computer, cause the computer to perform the wireless communication method according to the present disclosure.

According to another aspect of the present disclosure, executable computer instructions are provided. The executable computer instructions, when executed by a computer, cause the computer to perform the wireless communication method according to the present disclosure.

With the user equipment, the wireless communication method and the computer readable storage medium according to the present disclosure, the user equipment as a transmitting end may transmit a message to the user equipment as a receiving end. In addition, the user equipment as a receiving end may transmit feedback information to the user equipment as a transmitting end. The feedback information herein includes only one of ACK and NACK. In this way, the number of pieces of the feedback information can be greatly reduced, and thus collision of the feedback information can be reduced, thereby reducing a delay and improving performance of a wireless communication system including a sidelink.

Furthermore, with the user equipment, the wireless communication method and the computer readable storage medium according to the present disclosure, the user equipment as a transmitting end may transmit a message to the user equipment as a receiving end. In addition, the user equipment as a receiving end may transmit feedback information to other equipment than the user equipment as a transmitting end or transmit feedback information to the user equipment as a transmitting end for multiple times. In this way, a probability of successfully transmitting the feedback information is improved by transmitting the feedback information by means of the other equipment or transmitting the feedback information for multiple times, thereby improving performance of a wireless communication system including a sidelink.

A further applicable field becomes apparent from the description herein. The description and specific examples in the summary are only illustrative and are not intended to limit the scope of the present disclosure.

BRIEF DESCRIPTION OF THE DRAWINGS

The drawings described herein are used for illustrating the selected embodiments only rather than all of possible embodiments, and are not intended to limit the scope of the present disclosure. In the drawings:

FIG. 2 (*b*) is a schematic diagram of an application scenario according to another embodiment of the present disclosure;

FIG. 8 is a schematic diagram of a codebook for performing multiplexed feedback on receiving statuses of multiple receiving end equipments with respect to multiple TBs according to an embodiment of the present disclosure;

FIG. 9 (*a*) is a flowchart showing signaling of a process of transmitting scheduling information according to an embodiment of the present disclosure;

FIG. 9 (*b*) is a flowchart showing signaling of a process of transmitting scheduling information according to another embodiment of the present disclosure;

Figure 1:
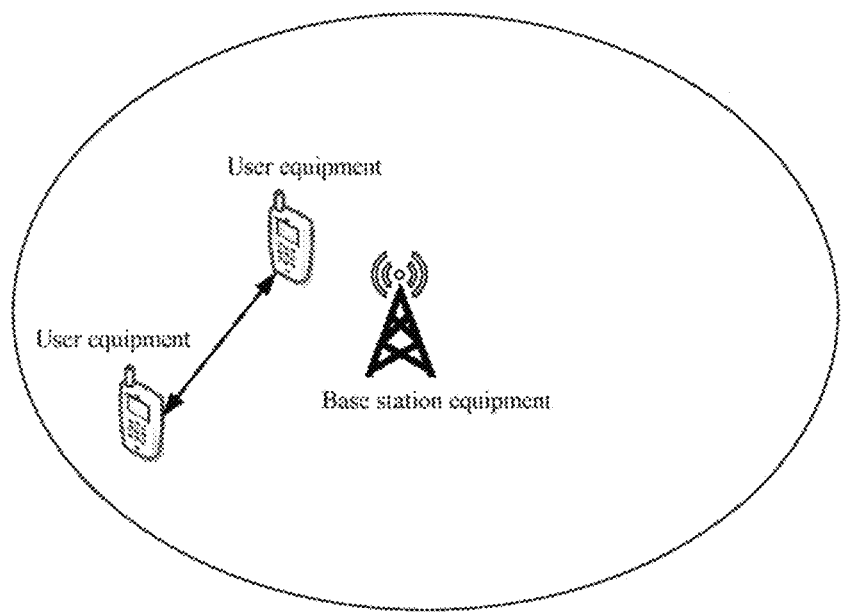
FIG. 1 is a schematic diagram of an application scenario according to an embodiment of the present disclosure.

Although the present disclosure is susceptible to various modifications and substitutions, specific embodiments thereof are shown in the drawings as examples and are described in detail herein. However, it should be understood that the description of specific embodiments herein is not intended to limit the present disclosure into a disclosed specific form. Instead, the present disclosure aims to cover all modifications, equivalents and substitutions within the spirit and the scope of the present disclosure. It should be noted that, corresponding reference numerals indicate corresponding components throughout the drawings.

DETAILED DESCRIPTION OF EMBODIMENTS

Now, examples of the present disclosure are described more fully with reference to the drawings. The following description is merely illustrative in nature and is not intended to limit the present disclosure and application or use.

Exemplary embodiments are provided so that the present disclosure can become exhaustive and the scope of the present disclosure can be fully conveyed to those skilled in the art. Examples of various specific details such as specific components, apparatuses, and methods are set forth to provide detailed understanding of the embodiments of the present disclosure. It is apparent to those skilled in the art that without specific details, the exemplary embodiments may be implemented in multiple different forms, none of which is construed as limiting the scope of the present disclosure. In some exemplary embodiments, well-known processes, well-known structures, and well-known technologies are not described in detail.

FIG. 1 is a schematic diagram showing an application scenario according to the present disclosure. As shown in FIG. 1, within coverage of a base station equipment, there are two user equipments that transmit information to each other in a straight-through manner. A link between the two user equipments is referred to as a sidelink (SL). Information transmitted between the two user equipments through the sidelink is referred to as a message below. It should be noted that although only two user equipments are shown in FIG. 1, more user equipments may be included within the coverage of the base station equipment.

Figure 2:
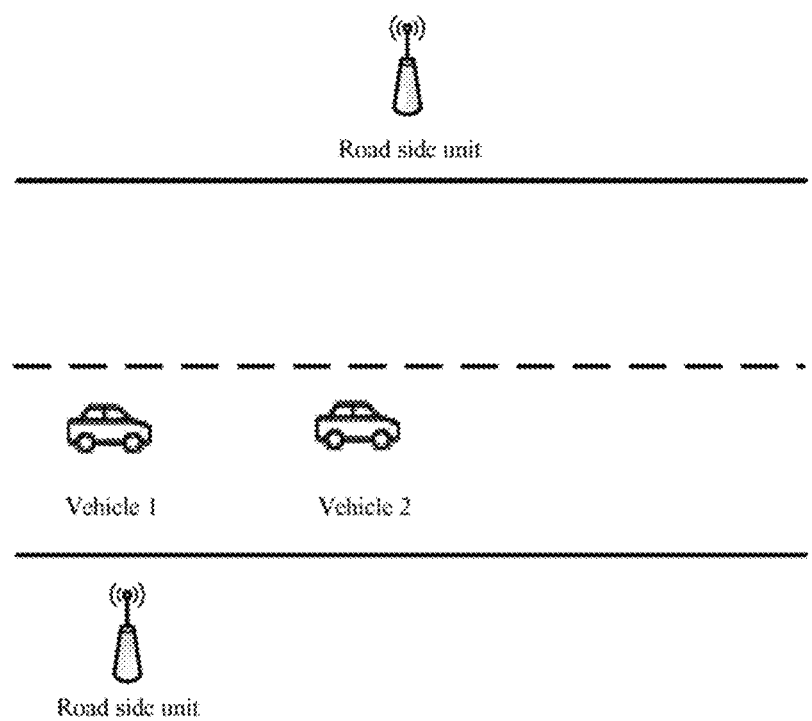
FIG. 2 (*a*) is a schematic diagram of an application scenario according to another embodiment of the present disclosure.
Figure 2:
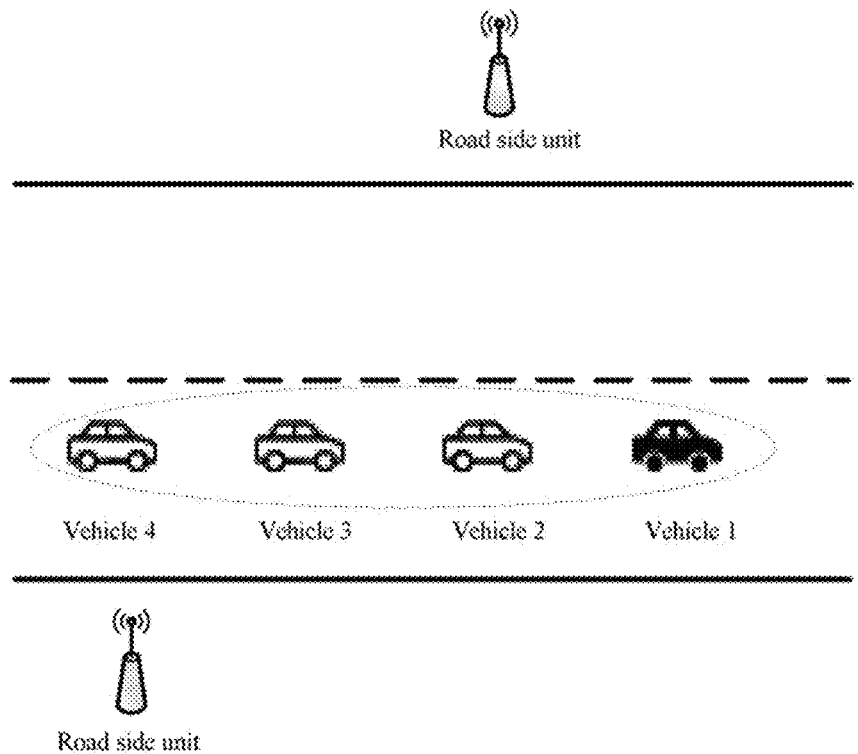

FIG. 2 (*a*) is a schematic diagram showing an application scenario according to another embodiment of the present disclosure. As shown in FIG. 2 (*a*), there are a vehicle 1 and a vehicle 2 on a road. Each of the vehicles is an example of a user equipment. That is, the vehicle 1 and the vehicle 2 may transmit information to each other in a straight-through manner. In this case, a wireless communication system shown in FIG. 2 (*a*) may further include a road side unit (RSU). The road side unit may serve the vehicles. Apparently, although not shown in FIG. 2 (*a*), the wireless communication system shown in FIG. 2 (*a*) may further include a network side equipment such as a TRP (Transmission Reception Point) and a base station equipment. It should be noted that although only two vehicles are shown in FIG. 2 (*a*), more vehicles may be included on the road.

FIG. 2 (*b*) is a schematic diagram showing an application scenario according to another embodiment of the present disclosure. As shown in FIG. 2 (*b*), there are a vehicle 1, a vehicle 2, a vehicle 3 and a vehicle 4 on a road. Any two of the four vehicles may transmit information to each other in a straight-through manner. In the example shown in FIG. 2 (*b*), the four vehicles run in a form of a motorcade, and the vehicle 1 serves as a leader vehicle. Motorcade running may be described as that a group of vehicles run in a dynamic chain manner. Other vehicles in the motorcade may acquire information from the leader vehicle. The information ensures that the vehicles run in the same direction with a shorter distance than usual through cooperation of the vehicles. In the motorcade running mode, a distance between two adjacent vehicles can be reduced. Road carrying capacity can be improved. Energy consumption and the number of drivers can be reduced. Similarly, the wireless communication system shown in FIG. 2 (*b*) may include a road side unit. The road side unit may serve the vehicles. In the motorcade running mode, information transmitted by the leader vehicle is usually related to a running strategy. Therefore, the leader vehicle is required to know receiving statuses of other vehicles with respect to the information. In addition, the leader vehicle may further transmit information in a multicast manner. Therefore, demands for a delay and reliability of feedback information are high, which leads to a high demand for design of HARQ.

The scenarios applicable to the present disclosure are described above in conjunction with examples. Here scenarios shown in FIG. 2 (*a*) and FIG. 2 (*b*) are only special scenarios applicable to the embodiments of the present disclosure. The present disclosure is applicable to any wireless communication system including a sidelink.

In the scenarios shown in FIG. 2 (*a*) and FIG. 2 (*b*), the number of pieces of feedback information is large and collision is easy to occur in transmission using limited wireless resources, which increases a delay and reduces reliability. Therefore, a demand for design of HARQ is high. For such scenarios, a user equipment in a wireless communication system, a wireless communication method performed by the user equipment in the wireless communication system, and a computer readable storage medium are provided according to the present disclosure, to properly design the HARQ technology for a sidelink, so as to improve reliability of sidelink communication for various services.

The network side equipment according to the present disclosure may be any type of TRP. The TRP may have a function of transmitting and receiving. For example, the TRP may receive information from a user equipment and a base station equipment and may further send information to a user equipment and a base station equipment. In an example, the TRP may serve a user equipment and may be controlled by a base station equipment. That is, the base station equipment serves the user equipment via the TRP. In addition, the network side equipment according to the present disclosure may also be a base station equipment, for example, an eNB or a gNB (a base station in a fifth generation communication system).

The user equipment according to the present disclosure may be a mobile terminal (such as a smartphone, a tablet personal computer (PC), a notebook PC, a portable game terminal, a portable/dongle mobile router and a digital camera) or a vehicle terminal (such as a vehicle navigation equipment). The user equipment may further be implemented as a terminal performing machine to machine (M2M) communications (which is also referred to as a machine type communication (MTC) terminal). In addition, the user equipment may further be a wireless communication module (such as an integrated circuitry module including a single wafer) mounted on each of the above terminals. In addition, the user equipment may also be implemented as a vehicle.

The embodiments of the present disclosure may be applied to a wireless communication system including a sidelink, for example, a D2D (Device to Device) communication system. The embodiments of the present disclosure may be applied to a V2X (vehicle to other equipment) communication system. That is, in the V2X communication system, the user equipment may be a vehicle and the network side equipment may be a TRP or a base station equipment. Furthermore, the V2X communication system may further include a road side unit. The road side unit may be implemented by a network side equipment or a user equipment. In addition, the wireless communication system according to an embodiment of the present disclosure may be a 5G NR (New Radio) communication system.

Figure 3:
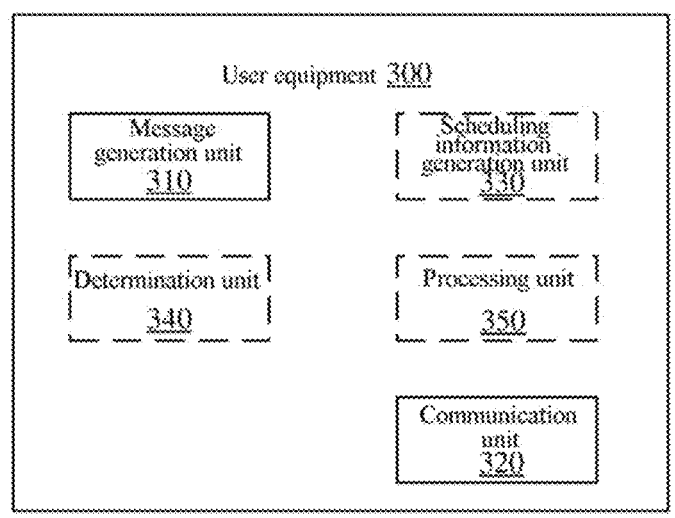
FIG. 3 is a block diagram showing a configuration example of a user equipment as a transmitting end according to an embodiment of the present disclosure.

FIG. 3 is a block diagram showing a configuration example of a user equipment 300 as a transmitting end according to an embodiment of the present disclosure.

As shown in FIG. 3, the user equipment 300 may include a message generation unit 310 and a communication unit 320.

Here units of the user equipment 300 may be included in processing circuitry. It should be noted that the user equipment 300 may include one processing circuitry or multiple processing circuitry. Further, the processing circuitry may include various separate functional units to perform various functions and/or operations. It should be noted that these functional units may be physical entities or logical entities, and units with different names may be implemented by one physical entity.

According to an embodiment of the present disclosure, the message generation unit 310 may generate a message to be transmitted to a receiving end equipment. Here the receiving end equipment is a user equipment. That is, the user equipment 300 and the receiving end equipment are user equipments in a wireless communication system. The user equipment 300 and the receiving end equipment may communicate with each other through a sidelink.

According to an embodiment of the present disclosure, the user equipment 300 may transmit information to other equipment and receive information from other equipment by means of the communication unit. Here the other equipment includes the receiving end equipment, other user equipment and a network side equipment. For example, the user equipment 300 may transmit, by means of the communication unit 320 and through a sidelink, a message generated by the message generation unit 310 to the receiving end equipment. The user equipment 300 may further receive, by means of the communication unit 320, feedback information representing a receiving status of the receiving end equipment with respect to the message. The feedback information includes only one of ACK and NACK.

It can be seen that the user equipment 300 according to an embodiment of the present disclosure may transmit a message to the receiving end equipment and the receiving end equipment may transmit feedback information to the user equipment 300. The feedback information herein includes only one of ACK and NACK. In this way, the number of pieces of the feedback information can be greatly reduced, and thus collision of the feedback information can be reduced, thereby reducing a delay and improving performance of a wireless communication system including a sidelink.

As shown in FIG. 3, the user equipment 300 according to an embodiment of the present disclosure may further include a scheduling information generation unit 330 and a determination unit 340.

According to an embodiment of the present disclosure, the determination unit 340 may determine all or part of information related to a HARQ process for each scheduling of the user equipment 300, which is described in detail below.

According to an embodiment of the present disclosure, the scheduling information generation unit 330 may generate scheduling information to be transmitted to the receiving end equipment according to configuration of the determination unit 340.

According to an embodiment of the present disclosure, the user equipment 300 may transmit scheduling information to the receiving end equipment through a sidelink. Here the user equipment 300 may transmit scheduling information in each scheduling. In addition, the user equipment 300 may transmit the scheduling information to the receiving end equipment via physical layer signaling, such as SCI (Sidelink Control Information).

According to an embodiment of the present disclosure, the determination unit 340 may determine HARQ indication information for each scheduling of the user equipment 300. The HARQ indication information represents whether this scheduling supports a HARQ mechanism. In addition, scheduling information generated by the scheduling information generation unit 330 may include the HARQ indication information.

According to an embodiment of the present disclosure, the determination unit 340 may determine a HARQ process serial number for scheduling of the user equipment 300. The HARQ process serial number identifies a HARQ process. HARQ process serial numbers and HARQ processes are in one-to-one correspondence. The scheduling information generated by the scheduling information generation unit 330 may include the HARQ process serial number. According to an embodiment of the present disclosure, the determination unit 340 may configure a HARQ process serial number for this scheduling in a case that this scheduling supports the HARQ mechanism.

According to an embodiment of the present disclosure, the determination unit 340 may determine new data indication information for scheduling of the user equipment 300. The new data indication information represents whether a message transmitted in this scheduling is initially-transmitted data or repeatedly-transmitted data. The scheduling information generated by the scheduling information generation unit 330 may include the new data indication information. According to an embodiment of the present disclosure, the determination unit 340 may configure new data indication information for this scheduling in a case that this scheduling supports the HARQ mechanism.

According to an embodiment of the present disclosure, the determination unit 340 may determine feedback indication information for scheduling of the user equipment 300. The feedback indication information represents whether this scheduling requires the receiving end equipment to perform feedback. The scheduling information generated by the scheduling information generation unit 330 may include the feedback indication information. According to an embodiment of the present disclosure, the determination unit 340 may determine feedback indication information for this scheduling in a case that this scheduling supports the HARQ mechanism.

According to an embodiment of the present disclosure, the determination unit 340 may determine feedback type information for scheduling of the user equipment 300. The feedback type information represents whether the feedback information includes ACK or NACK. The scheduling information generated by the scheduling information generation unit 330 may include the feedback type information. According to an embodiment of the present disclosure, the determination unit 340 may determine the feedback type information according to a service type and a channel transmission condition of this scheduling. According to an embodiment of the present disclosure, there may be only two feedback types, which are: the feedback information only including ACK, and the feedback information only including NACK. In an embodiment, there may be four feedback types, which are: no feedback, the feedback information only including ACK, the feedback information only including NACK, and the feedback information including ACK and NACK. In addition, According to an embodiment of the present disclosure, the determination unit 340 may determine feedback indication information for this scheduling in a case that this scheduling requires the receiving end equipment to perform feedback.

As described above, according to an embodiment of the present disclosure, the scheduling information may include the feedback type information, such that the receiving end equipment may determine a type of the feedback information, so as to greatly reduce the number of pieces of the feedback information in a case that the feedback information includes only one of ACK and NACK.

According to an embodiment of the present disclosure, the determination unit 340 may determine time information and resource information for scheduling of of the user equipment 300. The time information represents a feedback time for the feedback information and the resource information represents resources used by the feedback information. The scheduling information generated by the scheduling information generation unit 330 may include the time information and the resource information. In addition, according to an embodiment of the present disclosure, the determination unit 340 may determine time information and resource information for this scheduling in a case that this scheduling requires the receiving end equipment to perform feedback.

According to an embodiment of the present disclosure, the time information determined by the determination unit 340 may include an interval time and/or an interval type. The interval time represents an interval time starting from receipt of the message by the receiving end equipment to transmission of the feedback information by the receiving end equipment. The interval time may be a period of time or a time range. The interval type represents a configuration type of the interval time. For example, the interval type may include semi-static configuration and dynamic configuration. A HARQ fixed time domain may be used to indicate the interval time and/or the interval type. Content of the HARQ fixed time domain is an index for indicating the interval time (or a range of the interval time) starting from receipt of the message by the receiving end equipment to transmission of the feedback information by the receiving end equipment and/or the interval type.

According to an embodiment of the present disclosure, the determination unit 340 may determine the interval time according to user equipment capabilities and frame structure configurations of the user equipment 300 and the receiving end equipment. For example, a time instant at which the feedback information is transmitted determined by the determination unit 340 is required to match the frame structures of the user equipment 300 and the receiving end equipment. The determination unit 340 may determine the interval type according to a service type of this scheduling. For example, for a periodic service, semi-static configuration may be used, while for a non-periodic service, dynamic configuration may be used.

According to an embodiment of the present disclosure, the resource information determined by the determination unit 340 may include at least one of frequency domain resources and code domain resources. The resource information may be indicated by using a PSCCH (Physical Sidelink Control Channel) resource indicator. Content of the PSCCH is an index for indicating resources used by the feedback information.

According to an embodiment of the present disclosure, the user equipment 300 may receive the feedback information according to the time information and the resource information in the scheduling information. For example, the user equipment 300 may receive the feedback information within a transmission time of the feedback information represented by the time information and on transmission resources of the feedback information represented by the resource information.

As described above, according to an embodiment of the present disclosure, the scheduling information may include the time information and the resource information, such that the receiving end equipment may transmit the feedback information according to dynamic scheduling. In this way, a non-synchronous HARQ is realized. That is, repeated transmission may be performed at any time and on any resource, which causes the HARQ process to be flexible.

According to an embodiment of the present disclosure, generally, for each scheduling between the user equipment 300 and the receiving end equipment, data is transmitted in a unit of TB. That is, one TB is transmitted in each scheduling. However, a large TB may be divided into several CBGs, each of which includes one or more CBs (Codeblocks). In this case, a CBG transmission mode may be configured for the user equipment 300 and the receiving end equipment. That is, data transmission and data feedback are performed in a unit of CBG.

Figure 4:
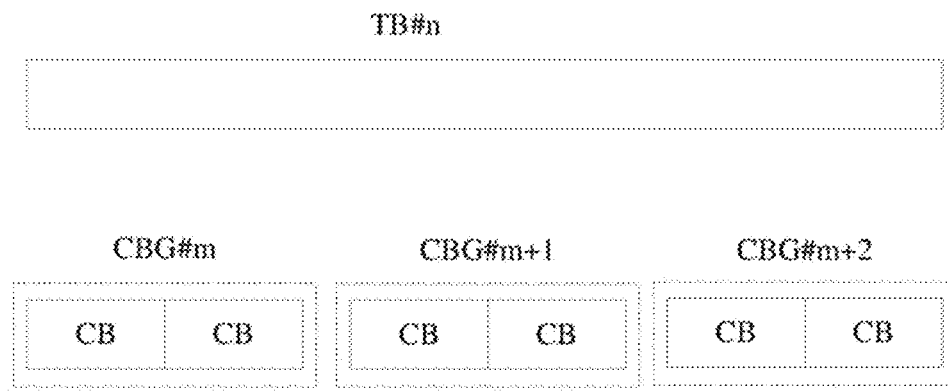
FIG. 4 is a schematic diagram showing relationship between a CBG (Codeblock Group) and a TB (Transport Block) according to an embodiment of the present disclosure.

FIG. 4 is a schematic diagram showing relationship between a CBG and a TB according to an embodiment of the present disclosure. As shown in FIG. 4, a TB (because HARQ processes and TBs are in one-to-one correspondence, there is no distinction between a HARQ process serial number and a TB serial number in the present disclosure) to which scheduling with a HARQ process serial number of n relates is divided into three CBGs, which are numbered m, (m+1), and (m+2), respectively. Each of the three CBGs includes two CBs. Relationship between a TB and a CBG is described in FIG. 4 by taking a case in which one TB is divided into three CBGs and each CBG includes two CBs as an example. Apparently, one TB may also be divided into other numbers of CBG, and CBGs may be different in the number of CBs included in each CBG.

According to an embodiment of the present disclosure, in a case that the CBG transmission mode is configured for the user equipment 300 and the receiving end equipment, the determination unit 340 may determine CBG information for each scheduling of the user equipment 300. The CBG information represents information related to a codeblock group CBG to which the message relates. The scheduling information generated by the scheduling information generation unit 330 may include the CBG information.

According to an embodiment of the present disclosure, the CBG information configured by the determination unit 340 may include a CBGTI (CBG Transmit Indicator) and a CBGFI (CBG Flush Indicator). Here the CBGTI indicates a position of a CBG transmitting the message. For example, the CBGTI may indicate whether any CBG exists in this scheduling by using a bitmap. In addition, the CBGFI represents whether to perform an emptying operation or a soft merge operation on the CBG indicated by CBGTI. For example, such information may be represented by a single bit.

As described above, according to an embodiment of the present disclosure, in a case that the CBG transmission mode is configured for the user equipment 300 and the receiving end equipment, the scheduling information may include the CBG information, such that data may be repeatedly transmitted in a unit of CBG. That is, only an error CBG is repeatedly transmitted, which saves system resources.

According to an embodiment of the present disclosure, the determination unit 340 may determine a partial feedback indicator (PFI) for each scheduling of the user equipment 300. The partial feedback indicator represents that the receiving end equipment performs feedback only with respect to a receiving status of a part of the message. The scheduling information generated by the scheduling information generation unit 330 may include the partial feedback indicator.

According to an embodiment of the present disclosure, the partial feedback indicator determined by the determination unit 340 may include a Non-continuous Feedback Indicator. The Non-continuous Feedback Indicator represents that the receiving end equipment performs feedback at an interval of (p) TBs and feedback is performed only on a receiving status with respect to a current TB.

As described above, according to an embodiment of the present disclosure, for some fault-tolerant services, such as a periodic service in which a data change is not obvious (for example, in a sensor data exchange service between vehicles, an interval of data collection time/space between two adjacent exchanges is small), the receiving end equipment may perform feedback only with respect to a receiving status of a part of the message, thereby greatly reducing the number of pieces of the feedback information and saving signaling overheads.

According to an embodiment of the present disclosure, the determination unit 340 may determine repeated transmission times information for each scheduling of the user equipment 300. The repeated transmission times information represents the number of times of repeated transmissions of the feedback information. The scheduling information generated by the scheduling information generation unit 330 may include the repeated transmission times information. In addition, in this case, the user equipment 300 may receive, according to the determined number of times of the repeated transmissions, feedback information from the receiving end equipment for multiple times.

According to an embodiment of the present disclosure, in a case that quality of a channel between the user equipment 300 and the receiving end equipment is poor or the receiving end equipment is far away from the user equipment 300, the user equipment 300 may fail to receive the feedback information from the receiving end equipment. In this case, the user equipment 300 may require the receiving end equipment to transmit the feedback information for multiple times, thereby increasing a possibility of successfully receiving the feedback information.

According to an embodiment of the present disclosure, the determination unit 340 may determine information about an auxiliary equipment for each scheduling of the user equipment 300. The auxiliary equipment assists in transmitting the feedback information from the receiving end equipment. That is, the scheduling information includes identification information of other equipment, so as to transmit the feedback information to the other equipment by the receiving end equipment. The scheduling information generated by the scheduling information generation unit 330 may include the information of the auxiliary equipment. In addition, in this case, the user equipment 300 may receive, from other equipment, the feedback information from the receiving end equipment.

According to an embodiment of the present disclosure, the auxiliary equipment (or other equipment) may be other user equipment than the user equipment 300 and the receiving end equipment, other network node such as a network side equipment (for example, a TRP and a base station equipment), and a road side unit.

According to an embodiment of the present disclosure, in a case that the auxiliary equipment is a network side equipment and the receiving end equipment is required to perform feedback, assuming that the network side equipment may make a scheduling decision for the user equipment 300, the network side equipment may allocate resources for a subsequent HARQ process instead of forwarding the feedback information to the user equipment 300. For example, the network side equipment may directly make a decision for scheduling required by the user equipment 300 on initially transmitting data or repeatedly transmitting data and transmit a scheduling allocation to the user equipment 300.

As described above, in a case that the quality of the channel between the user equipment 300 and the receiving end equipment is poor or the receiving end equipment is far away from the user equipment 300, the user equipment 300 may fail to receive the feedback information from the receiving end equipment. In this case, the user equipment 300 may require the receiving end equipment to transmit the feedback information to other equipment and then the other equipment forwards the feedback information to the user equipment 300, thereby increasing a possibility of successfully receiving the feedback information. The above manner may be applied not only in the case of unicast, but also in a case of multicast. In a case of unicast, the user equipment 300 may determine the auxiliary equipment according to a distance and channel quality. In a case of multicast, the user equipment 300 transmits information to an equipment group including multiple receiving equipments in a multicast manner. The auxiliary equipment may be a user equipment in the equipment group, a network side equipment, or a road side unit. In this case, other equipment assists in transmitting the feedback information, which improves a possibility of successfully receiving the feedback information. In addition, feedback information of multiple equipments may be transmitted together, thereby saving signaling overheads and system resources.

According to an embodiment of the present disclosure, as shown in FIG. 3, the user equipment 300 may further include a processing unit 350. The processing unit 350 is configured to process the feedback information received by the user equipment 300. In a case that the determination unit 350 determines that the feedback information is ACK, it may be determined that the receiving end equipment correctly receives and decodes data. In a case that the determination unit 350 determines that the feedback information is NACK, it may be determined that the receiving end equipment does not correctly receive and decode the data, and thus repeated transmission may be performed.

According to an embodiment of the present disclosure, in a default case, the user equipment 300 may require the receiving end equipment to perform feedback with respect to each TB or each CBG. That is, in a case that data is transmitted in a unit of TB, the user equipment 300 may receive a piece of feedback information with respect to each TB. In a case that data is transmitted in a unit of CBG, the user equipment 300 may receive a piece of feedback information with respect to each CBG. Therefore, according to an embodiment of the present disclosure, the processing unit 350 may determine a receiving status of the receiving end equipment with respect to one TB or one CBG according to the feedback information.

According to an embodiment of the present disclosure, the user equipment 300 may further instruct the receiving end equipment to perform multiplexed feedback on receiving statuses with respect to multiple TBs or multiple CBGs. That is, a piece of feedback information may include receiving statuses with respect to multiple TBs or CBGs. In this case, the determination unit 340 may determine codebook configuration information. The codebook configuration information indicates a codebook for the receiving end equipment to perform multiplexed feedback on receiving statuses with respect to multiple TBs or CBGs. The scheduling information generated by the scheduling information generation unit 330 may include the codebook configuration information.

Figure 5:
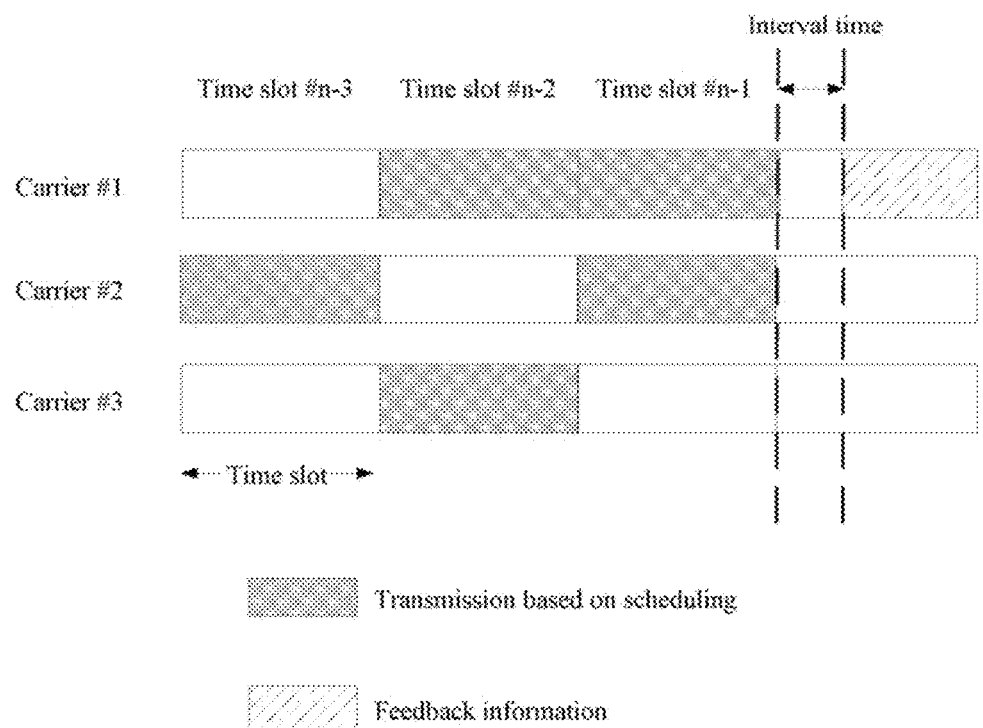
FIG. 5 is a schematic diagram showing transmissions of multiplexed feedback performed on receiving statuses with respect to multiple TBs and positions of resources occupied by the feedback according to an embodiment of the present disclosure.

FIG. 5 is a schematic diagram showing transmissions of multiplexed feedback performed on receiving statuses with respect to multiple TBs and positions of resources occupied by the feedback according to an embodiment of the present disclosure. As shown in FIG. 5, resources related to the multiple TBs include three time slots in time domain and include three carriers in frequency domain. The three carriers are numbered 1, 2 and 3, respectively. Based on different time resources and different frequency domain resources, the whole resource is divided into nine resources. Among the nine resources, on resources indicated by gray blocks (five), transmission based on scheduling is performed. On resources indicated by white blocks (four), no transmission based on scheduling is performed. According to an embodiment of the present disclosure, the user equipment 300 may instruct the receiving end equipment to perform multiplexed feedback on receiving statuses with respect to TBs to which the five resources indicated by gray blocks in the nine resources relates and the user equipment 300 may transmit codebook configuration information to the receiving end equipment. The user equipment 300 may further configure the interval time and resource information such as the carrier 1 that are as shown in FIG. 5. After the interval time from a period of time of resources to which the multiple TBs shown in FIG. 5 relates, the user equipment 300 may receive, on the carrier 1, the feedback information from the receiving end equipment.

According to an embodiment of the present disclosure, the receiving end equipment may transmit the feedback information using a dynamic codebook or a static codebook. In a case that the static codebook is used, the receiving end equipment is required to perform feedback on receiving status with respect to all resources in the entire time span and the entire frequency span to which a TB relates. That is, the receiving end equipment is required to perform feedback with respect to the nine resources as shown in FIG. 5. In a case that the dynamic codebook is used, the receiving end equipment is only required to perform feedback on receiving statuses with respect to resources on which transmission is performed. That is, the receiving end equipment is required to perform feedback with respect to five resources indicated by gray blocks as shown in FIG. 5.

Taking transmission in which multiplexed feedback is performed on receiving statuses with respect to multiple TBs shown in FIG. 5 as an example, in a case that the receiving end equipment transmits feedback information using the static codebook, there may include the following cases. In a case that the receiving end equipment is configured to perform feedback by transmitting ACK and NACK, with respect to the resources indicated by white blocks, no feedback is performed on the receiving statuses, or feedback is performed by transmitting NACK. With respect to the resources indicated by gray blocks shown in FIG. 5, feedback is performed by transmitting ACK if a TB is decoded correctly and feedback is performed by transmitting NACK if a TB is decoded erroneously. In a case that the receiving end equipment is configured to perform feedback only by transmitting ACK, with respect to the resources indicated by white blocks, no feedback is performed on the receiving statuses. With respect to the resources indicated by gray blocks shown in FIG. 5, feedback is performed by transmitting ACK if a TB is decoded correctly and no feedback is performed on the receiving statuses if a TB is decoded erroneously. In a case that the receiving end equipment is configured to perform feedback only by transmitting NACK, with respect to the resources indicated by white blocks, no feedback is performed on the receiving statuses. With respect to the resources indicated by gray blocks shown in FIG. 5, no feedback is performed on the receiving statuses if a TB is decoded correctly and feedback is performed by transmitting NACK if a TB is decoded erroneously. It should be noted that, in a case that static codebook is used, no feedback performed on the receiving statuses does not mean that a length of the feedback information becomes shorter. The length of the feedback information transmitted by using the static codebook is fixed. That is, regardless of whether feedback is performed on a receiving status with respect to a resource or not, the feedback information reserves resources for feedback with respect to the resource. Use of the static codebook is simple and easy to be implemented, thereby improving a probability of successfully decoding the feedback information by user equipment 300.

Taking transmission in which multiplexed feedback is performed on receiving statuses with respect to multiple TBs shown in FIG. 5 as an example, in a case that the receiving end equipment transmits feedback information using the dynamic codebook, there may include the following cases. In a case that the receiving end equipment is configured to perform feedback by transmitting ACK and NACK, with respect to the resources indicated by gray blocks shown in FIG. 5, feedback is performed by transmitting ACK if a TB is decoded correctly and feedback is performed by transmitting NACK if a TB is decoded erroneously. In a case that the receiving end equipment is configured to perform feedback only by transmitting ACK, with respect to the resources indicated by gray blocks shown in FIG. 5, feedback is performed by transmitting ACK if a TB is decoded correctly and no feedback is performed on the receiving statuses if a TB is decoded erroneously. In a case that the receiving end equipment is configured to perform feedback only by transmitting NACK, with respect to the resources indicated by gray blocks shown in FIG. 5, no feedback is performed on the receiving statuses if a TB is decoded correctly and feedback is performed by transmitting NACK if a TB is decoded erroneously. It can be seen that a length of the dynamic codebook is variable, and the length of the dynamic codebook depends on the number of all TBs transmitted based on scheduling over the entire time span and the entire frequency span of the codebook, or depends on the number of TBs with respect to which feedback is performed among the TBs transmitted based on scheduling. The length of the feedback information can be greatly reduced with the use of the dynamic codebook, thereby saving signaling overheads.

Figures 6, 7:
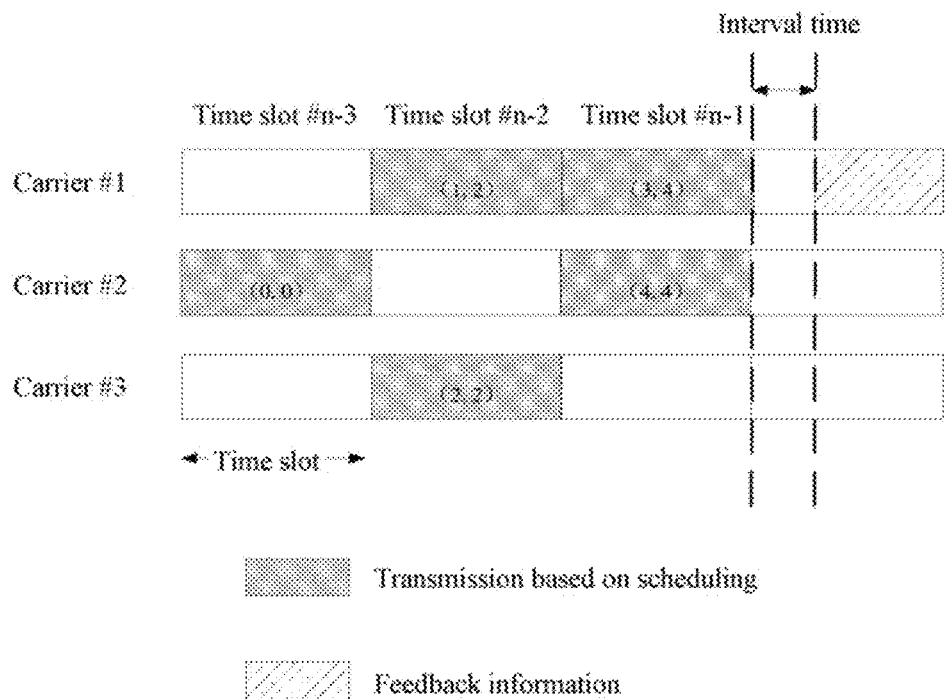
FIG. 6 is a schematic diagram of a codebook for performing multiplexed feedback on receiving statuses with respect to the multiple TBs shown in FIG. 5 according to an embodiment of the present disclosure.
FIG. 7 is a schematic diagram showing transmissions of multiplexed feedback performed on receiving statuses with respect to multiple TBs, positions of resources occupied by the feedback, and sidelink allocation indication information corresponding to a dynamic codebook according to another embodiment of the present disclosure.

FIG. 6 is a schematic diagram of a codebook for performing multiplexed feedback on receiving statuses of multiple TBs shown in FIG. 5 according to an embodiment of the present disclosure. As shown in FIG. 6, the codebook includes three time slots respectively numbered n−3, n−2 and n−1 in time span, and includes three carriers respectively numbered 1, 2 and 3 in frequency span. Taking a case in which the receiving end equipment is configured to perform feedback by transmitting ACK and NACK as an example, in a case that the static codebook is used, the feedback information is required to include receiving statuses with respect to the following nine resources: (carrier 1, time slot n−3), (carrier 1, time slot n−2), (carrier 1, time slot n−1), (carrier 2, time slot n−3), (carrier 2, time slot n−2), (carrier 2, time slot n−1), (carrier 3, time slot n−3), (carrier 3, time slot n−2), and (carrier 3, time slot n−1). Still taking the case in which the receiving end equipment is configured to perform feedback by transmitting ACK and NACK as an example, in a case that the dynamic codebook is used, the feedback information is required to include receiving statuses with respect to the following five resources: (carrier 1, time slot n−2), (carrier 1, time slot n−1), (carrier 2, time slot n−3), (carrier 2, time slot n−1), and (carrier 3, time slot n−2).

As described above, the length of the dynamic codebook is variable. Therefore, if the user equipment 300 and the receiving end equipment have a different understanding of the number of transmitted TBs, it may result in an error of format analysis of the dynamic codebook. According to an embodiment of the present disclosure, the user equipment 300 may transmit Sidelink Assignment Index (SAI) information to the receiving end equipment, to indicate the length of the dynamic codebook to the receiving end equipment. Here SAI may include a cSAI (counter SAI) and a tSAI (total SAI). cSAI represents the number of transmitted TBs until a current transmission. tSAI represents the total number of TBs transmitted on all frequency units until a time unit on which a currently transmitted TB is located. The total number of TBs may include the number of TBs that has been transmitted or the number of TBs that has not been transmitted.

FIG. 7 is a schematic diagram showing transmissions of multiplexed feedback performed on receiving statuses with respect to multiple TBs, positions of resources occupied by the feedback, and sidelink allocation indication information corresponding to a dynamic codebook according to another embodiment of the present disclosure. As shown in FIG. 7, the user equipment 300 may include the SAI information in the scheduling information. The former in parentheses indicates cSAI, and the latter in the parentheses indicates tSAI. In the example shown in FIG. 7, each of cSAI and tSAI is counted from 0. For example, a first TB transmitted by the user equipment 300 is located on the carrier 2 and the time slot n−3. Therefore, for the first TB transmitted by user equipment 300, cSAI=0 and tSAI=0. A next TB transmitted by the user equipment 300 is located on the carrier 1 and the time slot n−2. In this case, cSAI changes from 0 to 1 and a time unit on which the TB is located is the time slot n−2. Until the time slot n−2, the total number of TBs transmitted on three carriers is equal to 3. The three TBs are the TB on the carrier 2 and the time slot n−3, the TB on the carrier 1 and the time slot n−2, and the TB on the carrier 3 and the time slot n−2. Since tSAI is counted from 0, tSAI changes from 0 to 2. cSAI and tSAI of each TB can be obtained in this way.

As described above, according to an embodiment of the present disclosure, in a case that the dynamic codebook is used to transmit the feedback information, the user equipment 300 may transmit the SAI information to the receiving end equipment, to indicate the length of the dynamic codebook to the receiving end equipment. In this way, the user equipment 300 and the receiving end equipment have the same understanding of the length of the dynamic codebook, such that a probability of successfully decoding the feedback information can be increased while reducing a length of the feedback information.

According to an embodiment of the present disclosure, in a case that the receiving end equipment performs multiplexed feedback on receiving statuses with respect to multiple TBs, the processing unit 350 may determine a receiving status of the receiving end equipment with respect to each of the multiple TBs according to the feedback information.

As described above, according to an embodiment of the present disclosure, in a case that feedback scheduling of multiple HARQ processes is performed within one time unit, the receiving end equipment may perform multiplexed feedback with respect to the multiple HARQ processes. The time unit described herein may be a sub-frame, a time slot, or an OFDM symbol.

According to an embodiment of the present disclosure, the user equipment 300 may transmit a message to one receiving end equipment through a sidelink in a unicast manner. Alternatively, the user equipment 300 may transmit a message to multiple receiving end equipments through sidelinks in a multicast manner. In a case that the user equipment 300 transmits a message to one receiving end equipment in a unicast manner, the user equipment 300 may transmit scheduling information to the receiving end equipment through a sidelink in a unicast manner. In a case that the user equipment 300 transmits a message to multiple receiving end equipments in a multicast manner, the user equipment 300 may transmit scheduling information to the receiving end equipments through sidelinks in a multicast manner. The scheduling information transmitted in a multicast manner includes scheduling information with respect to each receiving end equipment. Alternatively, for each receiving end equipment, the user equipment 300 may transmit scheduling information of the receiving end equipment through a sidelink in a unicast manner.

According to an embodiment of the present disclosure, in a case that the user equipment 300 transmits a message to multiple receiving end equipments through sidelinks in a multicast manner, scheduling information configured by the determination unit 340 may include codebook configuration information. The codebook configuration information herein represents a codebook for performing multiplexed feedback on receiving statuses of multiple receiving end equipments with respect to one or more transport blocks TBs. That is, one piece of feedback information may include receiving statuses of the multiple receiving end equipments with respect to one TB or more TBs. The scheduling information generated by the scheduling information generation unit 330 may include the codebook configuration information.

FIG. 8 is a schematic diagram of a codebook for performing multiplexed feedback on receiving statuses of multiple receiving end equipments with respect to multiple TBs according to an embodiment of the present disclosure. As shown in FIG. 8, the user equipment 300 transmits three messages to an equipment group including a UE2, a UE3 and a UE4 in a multicast manner. Serial numbers of HARQ processes corresponding to transmission of the three messages are n+1, n+2 and n+3, respectively. In this case, any one of receiving end equipments UE2, UE3, and UE4 may collect a receiving status of each of the three receiving end equipments with respect to each of the three TBs.

According to an embodiment of the present disclosure, in a case that multiplexed feedback is performed on receiving statuses of multiple receiving end equipments with respect to one or more TBs, feedback information may be transmitted using the dynamic codebook and the static codebook. In a case that the static codebook is used, the feedback information includes receiving statuses of all receiving end equipments with respect to all TBs. In the example shown in FIG. 8, the feedback information is required to include a receiving status of each of the three receiving end equipments with respect to each of the three TBs. In a case that the dynamic codebook is used, the feedback information only includes receiving statuses of a receiving end equipment that performs feedback with respect to all TBs. In the example shown in FIG. 8, assuming that UE2 collects feedback information and UE2 does not receive feedback information from UE3, the feedback information received by the UE2 only includes receiving statuses of the UE2 and the UE4 with respect to each of the three TBs.

According to an embodiment of the present disclosure, in a case that multiplexed feedback is performed on receiving statuses of multiple receiving end equipments with respect to multiple TBs, the user equipment 300 may further transmit SAI to the receiving end equipment to count the number of transmitted TBs, that is, the cSAI parameter as described above. The solution herein is similar to the solution described above and is not repeated herein.

According to an embodiment of the present disclosure, the processing unit 350 may determine a receiving status of each of the multiple receiving end equipments with respect to each of the one or more TBs according to the feedback information.

As described above, according to an embodiment of the present disclosure, in a case that the user equipment 300 transmits a message to multiple receiving end equipments in a multicast manner, one of the multiple receiving end equipments (that is the auxiliary equipment described above) may perform multiplexed feedback on receiving statuses of the multiple receiving end equipments, so as to transmit multiplexed feedback information to the user equipment 300. In this case, the scheduling information transmitted by the user equipment 300 is required to include identification information of the auxiliary equipment.

As described above, the scheduling information transmitted by the user equipment 300 to the receiving end equipment may include a variety of information, including the HARQ identification information, the HARQ process serial number, the new data identification information, the feedback identification information, the feedback type identification, the time information and the resource information, the CBG information, the partial feedback indicator, the repeated transmission times, the identification information of other equipment, and the codebook configuration information. The user equipment 300 may determine that the scheduling information includes one or more of the above information as needed.

According to an embodiment of the present disclosure, all of the information included in the scheduling information may be configured by the user equipment 300. That is, a decision of this scheduling is made by the user equipment 300. For example, the user equipment 300 may make a decision according to a priority of this scheduled service, a delay demand of this scheduled service, a reliability demand of this scheduled service, and a minimum transmission range of the user equipment 300. In this case, the user equipment 300 may transmit the scheduling information in each scheduling. For example, the user equipment 300 transmits the scheduling information in each scheduling via a physical layer signaling such as SCI.

According an embodiment of the present disclosure, part of the information included in the scheduling information (for example, one or more of the HARQ indication information, the feedback indication information, the feedback type information, and the partial feedback indicator) may be preconfigured information. In this case, the user equipment 300 may transmit information other than the preconfigured information in each scheduling.

According an embodiment of the present disclosure, part of the information included in the scheduling information may also be configured by a network side equipment. That is, a decision for this scheduling is made by the network side equipment. For example, the network side equipment may make a decision according to the priority of this scheduled service, the delay demand of this scheduling service, the reliability demand of this scheduling service, and the minimum transmission range of the user equipment 300. In this case, the user equipment 300 may transmit a scheduling request for sidelink transmission to the network side equipment and receive a scheduling allocation for sidelink transmission from the network side equipment. For example, the scheduling allocation for sidelink transmission may include one or more of the HARQ indication information, the HARQ process number, the feedback indication information, the feedback type information, the time information and the resource information, and the partial feedback indicator. Here the network side equipment may transmit the scheduling allocation for sidelink transmission to the user equipment 300 via a physical layer signaling such as DCI (Downlink Control Information) or a higher layer signaling such as RRC. In addition, the user equipment 300 may transmit (for example, via the SCI signaling) the scheduling allocation for sidelink transmission received from the network side equipment and other required scheduling information to the receiving end equipment together.

FIG. 9 (a) and FIG. 9 (b) are flowcharts each showing signaling of a process of transmitting scheduling information according to an embodiment of the present disclosure. In FIG. 9 (a) and FIG. 9 (b), the transmitting UE may be implemented by the user equipment 300 as described above and the receiving UE may be implemented by the receiving end equipment as described above.

As shown in FIG. 9 (a), in step S901, the transmitting UE makes a decision for this scheduling and determines all scheduling information required for this scheduling. Next, in step S902, the transmitting UE transmits the scheduling information for this scheduling to the receiving UE. Here, in step S902, the transmitting UE may carry the scheduling information for this scheduling only through SCI.

As shown in FIG. 9 (b), in step S910, the transmitting UE transmits a scheduling request for sidelink transmission to a gNB. Next, in step S920, the gNB transmits a scheduling allocation for sidelink transmission to the transmitting UE. Next, in step S930, the transmission UE determines the scheduling information for this scheduling in conjunction with the received scheduling allocation. Next, in step S940, the transmitting UE transmits the scheduling information for this scheduling to the receiving UE. Here, in step S940, the transmitting UE may carry the scheduling information for this scheduling through SCI.

It can be seen that the user equipment 300 according to the embodiment of the present disclosure may transmit a message to the receiving end equipment, and the receiving end equipment may transmit feedback information to the user equipment 300. The feedback information herein includes only one of ACK and NACK. In this way, the number of pieces of the feedback information can be greatly reduced, and thus the collision of the feedback information can be reduced, thereby reducing a delay and improving performance of a wireless communication system including a sidelink. In addition, the user equipment 300 may transmit scheduling information to the receiving end equipment to configure all information required for this scheduling. For example, the user equipment 300 may configure resources required for this scheduling to cause a HARQ feedback process flexible, configure the number of times of repeated transmissions of the feedback information to increase a probability of successfully receiving the feedback information, configure an auxiliary equipment for assisting in transmitting the feedback information to increase the probability of successfully receiving the feedback information, configure multiplex feedback performed on receiving statuses of one receiving equipment with respect to multiple TBs, configure multiplex feedback performed on receiving statuses of multiple receiving equipments with respect to one or more TBs, and the like. In summary, according to the embodiments of the present disclosure, the HARQ process in a sidelink can be properly set.

Figure 10:
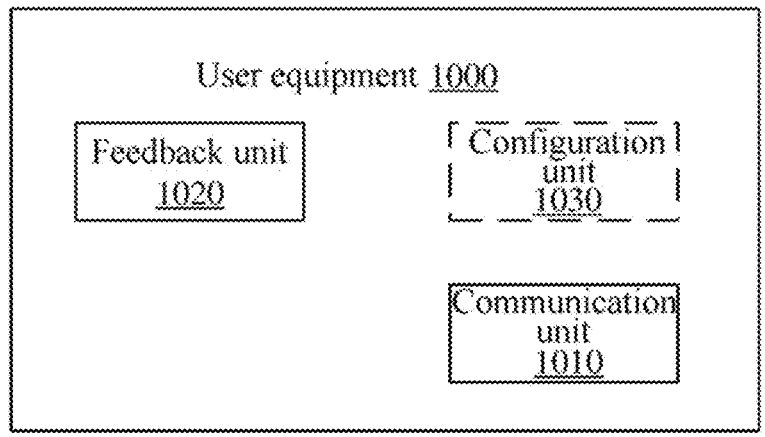
FIG. 10 is a block diagram showing a configuration example of a user equipment as a receiving end according to an embodiment of the present disclosure.

FIG. 10 is a block diagram of a structure of a user equipment 1000 as a receiving end according to an embodiment of the present disclosure. As shown in FIG. 10, the user equipment 1000 may include a communication unit 1010 and a feedback unit 1020.

Here units of the user equipment 1000 may be included in processing circuitry. It should be noted that the user equipment 1000 may include one processing circuitry or multiple processing circuitry. Further, the processing circuitry may include various separate functional units to perform various functions and/or operations. It should be noted that these functional units may be physical entities or logical entities, and units with different names may be implemented by one physical entity.

According to an embodiment of the present disclosure, the communication unit 1010 may receive a message from a transmitting end equipment through a sidelink. Here the transmitting end equipment is also a user equipment. The user equipment 1000 and the transmitting end equipment may communicate with each other through a sidelink. For example, the transmitting end equipment may be implemented by the user equipment 300 described above.

According to an embodiment of the present disclosure, the feedback unit 1020 may determine feedback information representing a receiving status of the user equipment 1000 with respect to the message. The feedback information includes only one of ACK and NACK. According to an embodiment of the present disclosure, the communication unit 1010 may transmit the feedback information determined by the feedback unit 1020.

It can be seen that the user equipment 1000 according to the embodiment of the present disclosure may transmit the feedback information to the transmitting end equipment. The feedback information herein includes only one of ACK and NACK. In this way, the number of pieces of the feedback information can be greatly reduced, and thus the collision of the feedback information can be reduced, thereby reducing a delay and improving performance of a wireless communication system including a sidelink.

According to an embodiment of the present disclosure, the communication unit 1010 may further receive scheduling information from the transmitting end equipment.

According to an embodiment of the present disclosure, as shown in FIG. 10, the user equipment 1000 may further include a configuration unit 1030. The configuration unit 1030 is configured to decode the scheduling information and configure receipt and feedback performed by the user equipment 1000 according to all information required for this scheduling.

According to an embodiment of the present disclosure, the configuration unit 1030 may determine whether this scheduling supports the HARQ mechanism according to HARQ indication information included in the scheduling information.

According to an embodiment of the present disclosure, the configuration unit 1030 may determine a HARQ process serial number of this scheduling according to a HARQ process serial number included in the scheduling information. In addition, the configuration unit 1030 may determine a TB corresponding to this schedule according to the HARQ process serial number and a target ID (in the case of the user equipment 1000 receiving unicast information) or a target multicast ID (in the case of the user equipment 1000 receiving multicast information).

According to an embodiment of the present disclosure, the configuration unit 1030 may determine whether the message transmitted in this scheduling is initially-transmitted data or repeatedly-transmitted data according to new data identification information included in the scheduling information. In a case that the message transmitted in this scheduling is the initially-transmitted data, the user equipment 1000 may directly decode the TB. In a case that the message transmitted in this scheduling transmission is the repeatedly-transmitted data, the user equipment 1000 may perform soft merge on cashed other receiving result with respect to the TB and the repeatedly-transmitted data, and then decode the merged data.

According to an embodiment of the present disclosure, the configuration unit 1030 may determine whether this scheduling requires feedback according to feedback indication information included in the scheduling information.

According to an embodiment of the present disclosure, the configuration unit 1030 may determine whether the feedback information includes only ACK or only NACK according to feedback type information included in the scheduling information.

According to an embodiment of the present disclosure, the configuration unit 1030 may determine a feedback time at which feedback information is transmitted according to time information included in the scheduling information. Here the configuration unit 1030 may determine, according to an interval time included in the time information, an interval time starting from receipt of the message by the user equipment to transmission of the feedback information by the user equipment, so as to determine the time at which the feedback information is transmitted. In addition, the configuration unit 1030 may determine a configuration type of the interval time according to an interval type included in the time information. The interval type herein includes semi-static configuration and dynamic configuration.

According to an embodiment of the present disclosure, the configuration unit 1030 may determine the resources used in transmitting the feedback information according to resource information included in the feedback information. Here the configuration unit 1030 may determine, according to the resource information, at least one of frequency domain resources and the code domain resources used in transmitting the feedback information.

After the configuration unit 1030 determines the feedback time at which the feedback information is transmitted and the resources used in transmitting the feedback information, the feedback unit 1020 may transmit the feedback information according to the time information and the resource information. For example, the feedback unit 1020 may transmit the feedback information to the transmitting end equipment at the determined feedback time using the determined resources used in transmitting the feedback information.

According to an embodiment of the present disclosure, the configuration unit 1030 may determine information related to the codeblock group CBG to which the message relates, according to CBG information included in the scheduling information. The configuration unit 1030 may determine a location of a CBG for transmitting the message according to a CBGTI included in the CBG information, and may determine whether to perform an emptying operation or a soft merge operation on the CBG indicated by the CBGTI according to a CBGFI.

According to an embodiment of the present disclosure, the configuration unit 1030 may determine, according to a partial feedback indicator included in the scheduling information, that feedback is performed only on receiving status with respect to part of the message. The configuration unit 1030 may determine, according to a discontinuous feedback indicator included in the scheduling information, that feedback is performed at an interval of (p) TBs and that feedback is performed on only a receiving status with respect to a current TB.

According to an embodiment of the present disclosure, the configuration unit 1030 may determine the number of times of repeated transmissions of the feedback information according to repeated transmission times information included in the scheduling information. Next, the user equipment 1000 may transmit the feedback information to the transmitting end equipment for multiple times.

According to an embodiment of the present disclosure, the configuration unit 1030 may determine other equipment according to identification information of the other equipment included in the scheduling information, such that the user equipment 1000 may transmit the feedback information to the other equipment. That is, the user equipment 1000 may transmit the feedback information to the other equipment, and then the other equipment forwards the feedback information to the transmitting end equipment, such that the feedback information from the user equipment 1000 is transmitted with the assistance of the other equipment.

According to an embodiment of the present disclosure, the user equipment 1000 may receive feedback information from other equipment and forward the received feedback information to the transmitting end equipment. That is, the user equipment 1000 may assist the other equipment in transmitting the feedback information from the other equipment.

According to an embodiment of the present disclosure, the user equipment 1000 may transmit one piece of feedback information with respect to each TB. That is, each TB corresponds to one piece of feedback information. In this case, the feedback unit 1020 may include a receiving status with respect to one TB in the feedback information.

According to an embodiment of the present disclosure, the user equipment 1000 may also perform multiplexed feedback on receiving statuses with respect to multiple TBs, such that one piece of feedback information includes the receiving statuses with respect to multiple TBs. In this case, the configuration unit 1030 may determine, according to codebook configuration information included in the scheduling information, a codebook for performing multiplexed feedback on the receiving statuses with respect to multiple TBs. In addition, the feedback unit 1020 may perform multiplexed feedback on the receiving statuses with respect to multiple TBs according to the codebook. As described above, the feedback unit 1020 may transmit the feedback information using the dynamic codebook and the static codebook.

As described above, the user equipment 1000 may receive unicast information or multicast information from the transmitting end equipment through a sidelink.

In a case that the user equipment 1000 receives multicast information from the transmitting end equipment through a sidelink, the transmitting end equipment may transmit multicast information to an equipment group consisting of multiple receiving end equipments and including the user equipment 1000. In this case, the user equipment 1000 may perform multiplexed feedback on receiving statuses of the multiple receiving end equipments including the user equipment 1000 with respect to one or more TBs. The configuration unit 1000 may determine, according to codebook configuration information included in the scheduling information, a codebook for performing multiplexed feedback on the receiving statuses of the multiple receiving end equipments including the user equipment 1000 with respect to one or more TBs. In addition, the feedback unit 1020 may perform multiplexed feedback on the receiving statuses of the multiple receiving end equipments including the user equipment 1000 with respect to one or more TBs.

According to an embodiment of the present disclosure, the user equipment 1000 may receive, from other receiving end equipment in the equipment group, a receiving status of the other receiving end equipment with respect to one or more TBs, so as to perform multiplexed feedback on a receiving status of each receiving end equipment in the equipment group with respect to one or more TBs. As described above, the user equipment 1000 may set multiplexed feedback information using the dynamic codebook or the static codebook.

In a case that the user equipment 1000 receives multicast information from the transmitting end equipment through a sidelink, the transmitting end equipment may transmit multicast information to the equipment group consisting of multiple receiving end equipments and including the user equipment 1000. In this case, other user equipment than the user equipment 1000 may perform multiplexed feedback on the receiving statuses of the multiple receiving end equipments including the user equipment 1000 with respect to one or more TBs. That is, the user equipment 1000 may transmit a receiving status of the user equipment 1000 with respect to one or more TBs to the other user equipment than the user equipment 1000.

As described above, the user equipment 1000 may receive the scheduling information from the transmitting end device and determine all information required for the feedback according to the scheduling information. The user equipment 1000 may receive the scheduling information via a physical layer signaling such as SCI. In addition, the user equipment 1000 may preconfigure part of the scheduling information.

According to an embodiment of the present disclosure, the feedback unit 1020 may decode the received message. According to an embodiment of the present disclosure, a unit to which the feedback information is with respect is TB or CBG. That is, the message is transmitted in a unit of TB or CBG Therefore, embodiments in the present disclosure described by taking a case in which a data transmission unit is TB as an example is applicable to a case in which the data transmission unit is CBG. In addition, according to an embodiment of the present disclosure, a receiving status with respect to the message includes the following three conditions: the message is received and correctly decoded; the message is received and not correctly decoded; the transmitting end equipment transmits the message but the user equipment 1000 does not receive the message.

According to an embodiment of the present disclosure, in a case of the configuration unit 1030 determining that the feedback information only includes ACK, the feedback information transmitted by the feedback unit 1020 includes ACK if the feedback unit 1020 correctly decodes the message, otherwise the feedback unit 1020 does not transmit the feedback information.

As described above, according to an embodiment of the present disclosure, the feedback information transmitted by the user device 1000 may include only ACK. In this way, in a case that the user equipment 1000 receives the message and does not correctly decode the message and in a case that the user equipment 1000 does not receive the message transmitted by the transmitting end equipment, the user equipment 1000 does not transmit the feedback information. The above implementation is simple. In addition, the number of pieces of the feedback information can be reduced.

A case in which the configuration unit 1030 determines that the feedback information includes only NACK is described in detail below.

In a case that the feedback unit 1020 correctly decodes the message, the feedback unit 1020 does not transmit the feedback information.

In a case that the feedback unit 1020 does not correctly decode the message, the feedback unit 1020 transmits NACK.

In a case that the user equipment 1000 does not receive the message transmitted by the transmitting end equipment, a processing operation is required to be performed. The processing operation includes, but is not limited to, transmitting NACK and transmitting PDU loss information. According to an embodiment of the present disclosure, the user equipment 1000 may determine, in some ways, that the transmitting end equipment transmits a message but the user equipment 1000 does not receive the message. Several non-restrictive examples are described in detail below.

According to an embodiment of the present disclosure, if a service type of this scheduling is periodic service, in a case that the user equipment 1000 does not receive a message within a receiving period, it may be determined that the transmitting end equipment transmits a message but the user equipment 1000 does not receive the message, and the feedback unit 1020 transmits NACK.

According to an embodiment of the present disclosure, for some environment-related services, the user equipment 1000 determines that the user equipment 1000 should receive a message in a case of perceiving a large change in the environment. In this case, a high layer of the user equipment 1000 may determine that the transmitting end equipment transmits a message but the user equipment 1000 does not receive the message. For example, in a V2X system, in a case of a vehicle as the user equipment 1000 predicting that a running strategy may change under some running conditions but the vehicle does not receive a new strategy from a leader vehicle, the vehicle determines that the transmitting end equipment transmits a message but the user equipment 1000 does not receive the message, and the feedback unit 1020 transmits NACK.

According to an embodiment of the present disclosure, in a case of the user equipment 1000 determining, in an ARQ (Automatic Repeat Request) process of an RLC (Radio Link Control) layer, that a PDU (Protocol Data Unit) is lost, the user equipment 1000 may determine that a TB in a MAC (Media Access Control) layer and corresponding to the lost PDU is also lost, so as to determine that the transmitting end equipment transmits a message but the user equipment 1000 does not receive the message. In this case, the user equipment 1000 is required to transmit PDU loss information to the transmitting end equipment. The PDU loss information is provided in a form of status report (Status Reports).

Figure 11:
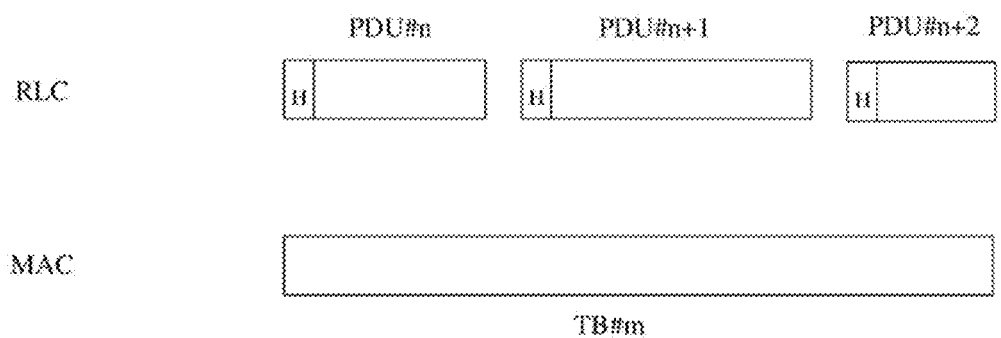
FIG. 11 is a schematic diagram showing relationship between a PDU (Protocol Data Unit) of a RLC (Radio Link Control) layer and a TB of a MAC (Media Access Control) layer according to an embodiment of the present disclosure.

FIG. 11 is a schematic diagram showing relationship between a PDU of an RLC layer and a TB of a MAC layer according to an embodiment of the present disclosure. As shown in FIG. 11, data transmission in the RLC layer is in a unit of PDU, where H represents a head of the PDU. Data transmission in the MAC layer is in a unit of TB. There is a mapping relationship between the PDU of the RLC layer and the TB of the MAC layer. For example, as shown in FIG. 11, there is a mapping relationship between the PDUs of the RLC layer numbered n, n+1, and n+2 respectively and the TB of the MAC layer numbered m. If the user equipment 1000 determines, in the ARQ process of RLC, that the PDU numbered n+1 is lost, the user equipment 1000 may be determine that the TB numbered m is lost.

As described above, according to an embodiment of the present disclosure, the feedback information transmitted by the user equipment 1000 may include only NACK. In a wireless communication system including a sidelink, a probability of successfully transmitting data is generally greater than a probability of unsuccessfully transmitting data. Therefore, by only transmitting NACK information, the number of pieces of the feedback information can be greatly reduced.

According to an embodiment of the present disclosure, the user equipment 1000 may carry the feedback information using SFCI (Sidelink Feedback Control Information). The SFCI may multiplex the SCI and a physical channel of the SCI only by modifying a format and content of the SCI. In addition, the user equipment 1000 may carry the feedback information using a PSCCH, a PSSCH (Physical Sidelink Share Channel) or new control information on a new physical channel for a sidelink, which is not limited in the present disclosure.

Figure 12:
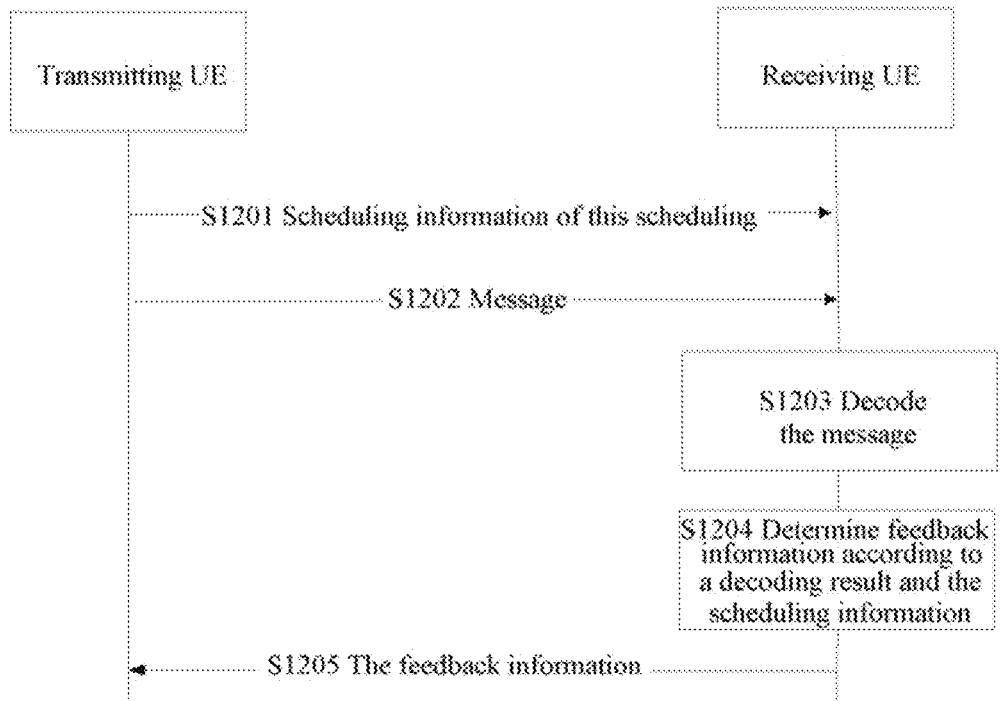
FIG. 12 is a flowchart showing signaling of a process of transmitting feedback information according to an embodiment of the present disclosure.

FIG. 12 is a flowchart showing signaling of a process of transmitting feedback information according to an embodiment of the present disclosure. As shown in FIG. 12, in step S1201, a transmitting UE transmits scheduling information for this scheduling to a receiving UE. Next, in step S1202, the transmitting UE transmits a message to the receiving UE. Next, in step S1203, the receiving UE decodes the received message. Next, in step S1204, the receiving UE determines feedback information according to a decoding result of the message and the scheduling information. For example, the receiving UE may determine whether the feedback information includes ACK or NACK, resources required for the feedback information, a transmitting time at which the feedback information is transmitted, and the like. Next, in step S1205, the receiving UE transmits the feedback information to the transmitting UE.

It can be seen that according to an embodiment of the present disclosure, the user equipment 1000 may transmit feedback information to the transmitting end equipment. The feedback information herein includes only one of ACK and NACK. In this way, the number of pieces of the feedback information can be greatly reduced, and thus the collision of the feedback information can be reduced, thereby reducing a delay and improving performance of a wireless communication system including a sidelink. The user equipment 1000 may further determine that the transmitting end equipment transmits a message and the user equipment 1000 does not receive the message, so as to trigger repeated transmission. In addition, the user equipment 1000 may further perform, according to configuration of the transmitting end equipment, multiplexed feedback on the receiving statuses with respect to multiple TBs, and perform multiplexed feedback on the receiving statuses of multiple transmitting end equipments including the user equipment 1000 with respect to one or more TBs, so as to cause the HARQ process in the sidelink proper.

As described above, a HARQ scheme for improving transmission reliability of feedback information is provided according to the present disclosure. A user equipment for improving the transmission reliability of feedback information is described in detail below.

The user equipment 300 as a transmitting end is described by taking FIG. 3 as an example. As shown in FIG. 3, the user equipment 300 may include the message generation unit 310 and the communication unit 320.

According to an embodiment of the present disclosure, the message generation unit 310 may generate a message to be transmitted to a receiving end equipment.

According to an embodiment of the present disclosure, the user equipment 300 may transmit a message to the receiving end equipment through a sidelink by means of the communication unit 320.

Here, the user equipment 300 may receive, from other equipment than the receiving end equipment, feedback information representing a receiving status of the receiving end equipment with respect to the message by means of the communication unit 320. That is, the feedback information is the receiving status of the receiving end equipment with respect to the message, and the user equipment 300 may receive the feedback information from other equipment.

According to an embodiment of the present disclosure, the user equipment 300 may further include the determination unit 340 and the scheduling information generation unit 330. The scheduling information generation unit 330 is configured to generate scheduling information to be transmitted to the receiving end equipment. The determination unit 340 is configured to determine all or part of information related to the HARQ process for the user equipment 300.

According to an embodiment of the present disclosure, the determination unit 340 may determine other equipment through which the feedback information is transmitted, such that the scheduling information generated by the scheduling information generation unit 330 includes identification information of the other equipment.

As described above, in a case that quality of the channel between the user equipment 300 and the receiving end equipment is poor, or the receiving end equipment is far away from the user equipment 300, the user equipment 300 may not be able to successfully receive the feedback information from the receiving end equipment. In this case, the user equipment 300 may require the receiving end equipment to transmit the feedback information to other equipment, and then the other equipment forwards the feedback information to the user equipment 300, thereby increasing the possibility of successfully receiving the feedback information. The above manner may be applied to a case of unicast and a case of multicast. In a case of unicast, the determination unit 340 in the user equipment 300 may determine an auxiliary equipment according to a location of the other equipment, the quality of the channel between the other equipment and the user equipment 300, and the quality of the channel between the other equipment and the receiving end equipment.

According to an embodiment of the present disclosure, the user equipment 300 may transmit a message to multiple receiving end equipments including the receiving end equipment in a multicast manner. Next, the user equipment 300 may receive, from the other equipment, feedback information from the multiple receiving end equipments.

As described above, in a case of multicast, the user equipment 300 transmits information to an equipment group including the receiving end equipment in a multicast manner. The auxiliary equipment may be the user equipment in the equipment group or a network side equipment. In this case, the other equipment assists in transmitting the feedback information, which improves the possibility of successfully receiving the feedback information. In addition, feedback information from multiple equipments may be transmitted together, thereby saving signaling overheads and system resources.

In addition, according to an embodiment of the present disclosure, the other equipment may perform multiplexed feedback on receiving statuses of multiple receiving end equipments. In this case, the scheduling information generation unit 330 of the user equipment 300 may generate scheduling information to be transmitted to the other equipment. The scheduling information includes codebook configuration information of a codebook for performing multiplexed feedback on receiving status of the multiple receiving end equipments.

According to an embodiment of the present disclosure, the other equipment may be a user equipment, a road side unit and a base station equipment. In a case that the other equipment is a user equipment or in a case that the other equipment is a road side unit and the road side unit is implemented by a user equipment, the user equipment 300 may receive feedback information from the other equipment through a sidelink between the user equipment 300 and the other equipment. In a case that the other equipment is a base station equipment or in a case that the other equipment is a road side unit and the road side unit is implemented by a network side equipment, the user equipment 300 may receive feedback information from the other equipment through a downlink. In addition, the feedback information may include feedback status of multiple receiving end equipments with respect to the message.

According to an embodiment of the present disclosure, the user equipment 300 may further include a processing unit 350. The processing unit 350 is configured to process the feedback information. In a case that the feedback information includes a feedback state of one receiving end equipment with respect to the message, the processing unit 350 may determine the feedback state of one receiving end equipment with respect to the message according to the feedback information. In a case that the feedback information includes feedback statuses of multiple receiving end equipments with respect to the message, the processing unit 350 may determine a receiving status of each of the multiple receiving end equipments with respect to the message according to the feedback information.

According to an embodiment of the present disclosure, the feedback information may include both of ACK and NACK. That is, a conventional HARQ scheme may be used. In the conventional HARQ scheme, the receiving end equipment transmits ACK in a case that correctly decoding the message and transmits NACK in a case that not correctly decoding the message. In this way, the user equipment 300 may determine feedback statuses of one or more receiving end equipments with respect to the message.

According to an embodiment of the present disclosure, the feedback information may include only one of ACK and NACK, which is described in detail in the embodiments that are described above and is not repeated herein.

According to an embodiment of the present disclosure, the user equipment 300 may further receive, from the receiving end equipment by means of the communication unit 320, feedback information representing the receiving status of the receiving end equipment with respect to the message for multiple times.

As described above, in a case that quality of the channel between the user equipment 300 and the receiving end equipment is poor or the receiving end equipment is far away from the user equipment 300, the user equipment 300 may not be able to successfully receive the feedback information from the receiving end equipment. In this case, the user equipment 300 may require the receiving end equipment to transmit the feedback information for multiple times, thereby increasing the possibility of successfully receiving the feedback information. The above manner may be applied to a case of unicast. For example, the determining unit 340 may determine the number of times of repeated transmissions of the feedback information according to a position of the receiving end equipment and the quality of the channel between the receiving end equipment and the user equipment 300.

According to an embodiment of the present disclosure, the scheduling information generated by the scheduling information generation unit 330 may include repeated transmission times information representing the number of times of repeated transmissions of the feedback information, such that the user equipment 300 may receive the feedback information from the receiving end equipment for multiple times.

Similarly, according to an embodiment of the present disclosure, the feedback information may include both of ACK and NACK. That is, the conventional HARQ scheme may be used. In the conventional HARQ scheme, the receiving end equipment transmits ACK in a case of correctly decoding the message and transmits NACK in a case of not correctly decoding the message. In this way, the user equipment 300 determines the feedback status of the receiving end equipment with respect to the message. In addition, the feedback information may include only one of ACK and NACK, which is described in detail in the embodiments that are described above and is not repeated herein.

As described above, according to an embodiment of the present disclosure, other equipment may be used to assist in transmitting the feedback information or transmitting the feedback information for multiple times, so as to increase the probability of successfully receiving the feedback information.

The user equipment 1000 as a receiving end is described below by taking FIG. 10 as an example. As shown in FIG. 10, the user equipment 1000 may include a communication unit 1010 and a feedback unit 1020.

According to an embodiment of the present disclosure, the communication unit 1010 may receive a message from the transmitting end equipment through a sidelink.

According to an embodiment of the present disclosure, the feedback unit 1020 may demodulate the message and generate feedback information representing a receiving status of the user equipment 1000 with respect to the message.

According to an embodiment of the present disclosure, the user equipment 1000 may transmit the feedback information representing the receiving status of the user equipment 1000 with respect to the message to other equipment than the transmitting end equipment by means of the communication unit 1010.

According to an embodiment of the present disclosure, the user equipment 1000 may receive scheduling information from the transmitting end equipment. In addition, the user equipment 1000 may further include a configuration unit 1030. The configuration unit 1030 is configured to determine the other equipment according to identification information of the other equipment included in the scheduling information.

According to an embodiment of the present disclosure, the other equipment may be a user equipment, a road side unit or a base station equipment. In a case that the other equipment is a user equipment or in a case that the other equipment is a road side unit and the road side unit is implemented by a user equipment, the user equipment 1000 may transmit feedback information through a sidelink between the user equipment 1000 and the other equipment. In a case that the other equipment is a base station equipment or in a case that the other equipment is a road side unit and the road side unit is implemented by a network side equipment, the user equipment 1000 may transmit feedback information to the other equipment through an uplink.

According to an embodiment of the present disclosure, in a case that the transmitting end equipment transmits a message to multiple receiving end equipments including the user equipment 1000 in a multicast manner, after receiving the message from the transmitting end equipment through a sidelink, the user equipment 1000 may receive, from other receiving end equipment through a sidelink, feedback information representing a receiving status of the other receiving end equipment with respect to the message. Then multiplexed feedback is performed on the feedback information of the other receiving end equipment and the feedback information of the user equipment 1000, and the feedback information of the other receiving end equipment and the feedback information of the user equipment 1000 are transmitted to the transmitting end equipment. That is, the user equipment 1000 may serve as an "other equipment" for the other receiving end equipment.

According to an embodiment of the present disclosure, the user equipment 1000 may further transmit feedback information representing a receiving status of the user equipment 1000 with respect to the message to the transmitting end equipment for multiple times.

According to an embodiment of the present disclosure, the user equipment 1000 may receive scheduling information from the transmitting end equipment through the communication unit 1010, and the configuration unit 1030 may determine the number of times of repeated transmissions of the feedback information according to the repeated transmission times information included in the scheduling information. Then the user equipment 1000 may transmit the feedback information to the transmitting end equipment for multiple times by means of the communication unit 1010.

According to an embodiment of the present disclosure, the feedback information may include both ACK and NACK. That is, in a case of correctly decoding the message, the feedback information transmitted by the feedback unit 1020 is ACK. In a case of not correctly decoding the message, the feedback information transmitted by the feedback unit 1020 is NACK. In addition, the feedback information may include only one of ACK and NACK, which is described in detail in the embodiments that are described above, and is not repeated herein.

As described above, a configuration scheme for scheduling information about the HARQ process is provided according to the present disclosure. The user equipment 300 as a transmitting end is described still by taking FIG. 3 as an example.

The scheduling information generation unit 330 of the user equipment 300 may generate scheduling information about the HARQ process, such that the user equipment 300 may transmit the scheduling information to the receiving end equipment through a sidelink by means of the communication unit 320. Here, the scheduling information may include feedback type indication information of the message transmitted by the user equipment 300 to the receiving end equipment. The feedback type indication information includes at least one of: no feedback is performed on a receiving status with respect to the message; only ACK is transmitted; only NACK is transmitted; and it is determined whether ACK or NACK is transmitted according to the receiving status with respect to the message. For example, the feedback type indication information may indicate any one of the above four feedback types through 2 bits of information. On receipt of the feedback type indication information, the receiving end equipment may determine, according to the feedback type indication information, whether to perform feedback with respect to the message from the user equipment 300 and how to perform feedback on the receiving status with respect to the message.

According to an embodiment of the present disclosure, for ease of illustration, the user equipment 300 as a transmitting end and the user equipment 1000 as a receiving end are described by taking FIG. 3 and FIG. 10 as examples, respectively. It should be noted that in a wireless communication system, any user equipment may serve as a transmitting end equipment or a receiving end equipment. Therefore, the user equipment may include the units shown in FIG. 3 and the units shown in FIG. 10. That is, in a case that the user equipment serves as a transmitting end equipment, the units shown in FIG. 3 may be used. In a case that the user equipment serves as a receiving end equipment, the units shown in FIG. 10 may be used.

A wireless communication method performed by a user equipment according to an embodiment of the present disclosure is described in detail below.

Figure 13:
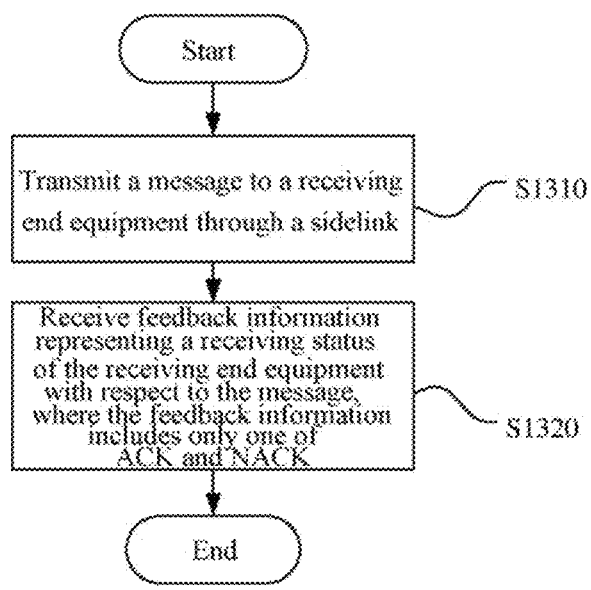
FIG. 13 is a flowchart of a wireless communication method performed by the user equipment as a transmitting end according to an embodiment of the present disclosure.

FIG. 13 is a flowchart of the wireless communication method performed by the user equipment 300 as a transmitting end in a wireless communication system according to an embodiment of the present disclosure.

As shown in FIG. 3, in step S1310, a message is transmitted to a receiving end equipment through a sidelink.

Next, in step S1320, feedback information representing a receiving status of the receiving end equipment with respect to the message is received. The feedback information includes only one of ACK and NACK.

Preferably, the wireless communication method further includes: transmitting scheduling information to the receiving end equipment. The scheduling information includes feedback type information representing whether the feedback information comprises ACK or NACK.

Preferably, the wireless communication method further includes: transmitting scheduling information to the receiving end equipment where the scheduling information includes time information representing a feedback time for the feedback information and resource information representing resources used by the feedback information; and receiving the feedback information according to the time information and the resource information.

Preferably, the time information includes an interval time and/or an interval type. The interval time represents an interval time starting from receipt of the message by the receiving end equipment to transmission of the feedback information by the receiving end equipment. The interval type represents a configuration type of the interval time.

Preferably, the resource information includes at least one of frequency domain resources and code domain resources.

Preferably, the wireless communication method further includes: transmitting scheduling information to the receiving end equipment. The scheduling information includes one or more of: HARQ indication information representing whether this scheduling supports a HARQ mechanism, a HARQ process serial number of this scheduling, new data indication information representing whether a message transmitted in this scheduling is initially-transmitted data or repeatedly-transmitted data, and feedback indication information representing whether this scheduling requires the receiving end equipment to perform feedback.

Preferably, the wireless communication method further includes: transmitting scheduling information to the receiving end equipment. The scheduling information includes CBG information related to a codeblock group CBG to which the message relates.

Preferably, the wireless communication method further includes: transmitting scheduling information to the receiving end equipment. The scheduling information includes a partial feedback indicator representing that the receiving end equipment performs feedback only with respect to a receiving status of a part of the message.

Preferably, the wireless communication method further includes: determining a receiving status of the receiving end equipment with respect to one transport block TB or one codeblock group CBG according to the feedback information.

Preferably, the wireless communication method further includes: transmitting scheduling information to the receiving end equipment where the scheduling information includes codebook configuration information of a codebook for the receiving end equipment to perform multiplexed feedback on receiving statuses with respect to multiple transport blocks TBs; and determining a receiving status of the receiving end equipment with respect to each of the multiple transport blocks TBs, according to the feedback information.

Preferably, the wireless communication method further includes: transmitting scheduling information to the receiving end equipment where the scheduling information includes codebook configuration information of a codebook for multiple receiving end equipments to perform multiplexed feedback on a receiving status with respect to one or more transport blocks TBs; and determining a receiving status of each of the multiple receiving end equipments with respect to each of the one or more transport blocks TBs, according to the feedback information.

Preferably, the wireless communication method further includes: transmitting a message to one receiving end equipment through a sidelink in a unicast manner; or transmitting a message to multiple receiving end equipments through a sidelink in a multicast manner.

Preferably, the wireless communication method further includes: transmitting scheduling information to the receiving end equipment where the scheduling information includes repeated transmission times information representing the number of times of repeated transmissions of the feedback information; and receiving the feedback information from the receiving end equipment for a plurality of times.

Preferably, the wireless communication method further includes: transmitting scheduling information to the receiving end equipment where the scheduling information includes identification information of other equipment for the receiving end equipment to transmit the feedback information to the other equipment; and receiving the feedback information from the other equipment.

According to an embodiment of the present disclosure, the above method may be performed by the user equipment 300 according to an embodiment of the present disclosure. Therefore, all embodiments of the user equipment 300 that are described above are applicable herein.

Figure 14:
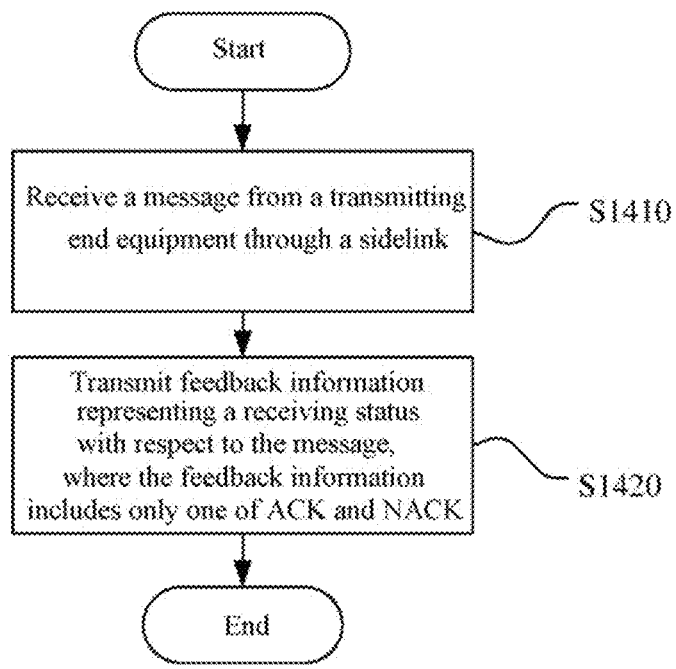
FIG. 14 is a flowchart of a wireless communication method performed by the user equipment as a receiving end according to an embodiment of the present disclosure.

FIG. 14 is a flowchart of a wireless communication method performed by the user equipment 1000 as a receiving end in a wireless communication system according to an embodiment of the present disclosure.

As shown in FIG. 14, in step S1410, a message is received from a transmitting end equipment through a sidelink.

Next, in step S1420, feedback information representing a receiving status of the user equipment with respect to the message is transmitted. The feedback information includes only one of ACK and NACK.

Preferably, the wireless communication method further includes: receiving scheduling information from the transmitting end equipment; and determining whether the feedback information comprises ACK or NACK according to feedback type information comprised in the scheduling information.

Preferably, the wireless communication method further includes: receiving scheduling information from the transmitting end equipment; determining a feedback time for transmitting the feedback information according to time information comprised in the scheduling information; determining resources for transmitting the feedback information according to resource information comprised in the feedback information; and transmitting the feedback information according to the time information and the resource information.

Preferably, the wireless communication method further includes: determining, according to an interval time comprised in the time information, the interval time starting from receipt of the message by the user equipment to transmission of the feedback information by the user equipment, and determine, according to an interval type comprised in the time information, a configuration type of the interval time.

Preferably, the wireless communication method further includes: determining at least one of frequency domain resources and code domain resources for transmitting the feedback information according to the resource information.

Preferably, the wireless communication method further includes: receiving scheduling information from the transmitting end equipment; and determining, according to the scheduling information, one or more of: whether this scheduling supports a HARQ mechanism; a HARQ process serial number of this scheduling; whether a message transmitted in this scheduling is initially-transmitted data or repeatedly-transmitted data; and whether this scheduling requires feedback.

Preferably, the wireless communication method further includes: receiving scheduling information from the transmitting end equipment; and determining information related to a codeblock group CBG to which the message relates according to CBG information comprised in the scheduling information.

Preferably, the wireless communication method further includes: receiving scheduling information from the transmitting end equipment; and determining, according to a partial feedback indicator comprised in the scheduling information, that feedback is performed only on a receiving status of a part of the message.

Preferably, the wireless communication method further includes: determining one transport block TB to which the message relates; and including a receiving status with respect to the transport block TB in the feedback information.

Preferably, the wireless communication method further includes: receiving scheduling information from the transmitting end equipment; determining, according to codebook configuration information included in the scheduling information, a codebook for performing multiplexed feedback on receiving statuses with respect to multiple transport blocks TBs; and performing multiplexed feedback on the receiving statuses with respect to the multiple transport blocks TBs according to the codebook.

Preferably, the wireless communication method further includes: receiving scheduling information from the transmitting end equipment; determining, according to codebook configuration information included in the scheduling information, a codebook for multiple receiving end equipments including the user equipment to perform multiplexed feedback on a receiving status with respect to one or more transport blocks TBs; and performing multiplexed feedback on the receiving status of the multipel receiving end equipments including the user equipment with respect to one or more transport blocks TBs.

Preferably, the wireless communication method further includes: receiving scheduling information from the transmitting end equipment; determining the number of times of repeated transmissions of the feedback information according to repeated transmission times information included in the scheduling information; and transmitting the feedback information to the transmitting end equipment for multiple times.

Preferably, the wireless communication method further includes: receiving scheduling information from the transmitting end equipment; determining other equipment according to identification information of the other equipment included in the scheduling information; and transmitting the feedback information to the other equipment.

Preferably, the wireless communication method further includes: transmitting, in a case that the user equipment correctly decodes the message, ACK to the transmitting end equipment; and transmitting, in a case that the user equipment does not correctly decode the message, no feedback information to the transmitting end equipment.

Preferably, the wireless communication method further includes: transmitting, in a case that the user equipment does not correctly decode the message or the user equipment does not receive the message, NACK to the transmitting end equipment; and transmitting, in a case that the user equipment receives the message and the user equipment correctly decodes the message, no feedback information to the transmitting end equipment.

According to an embodiment of the present disclosure, the above method may be performed by the user equipment 1000 according to an embodiment of the present disclosure. Therefore, all embodiments of the user equipment 1000 that are described above are applicable herein.

Figure 15:
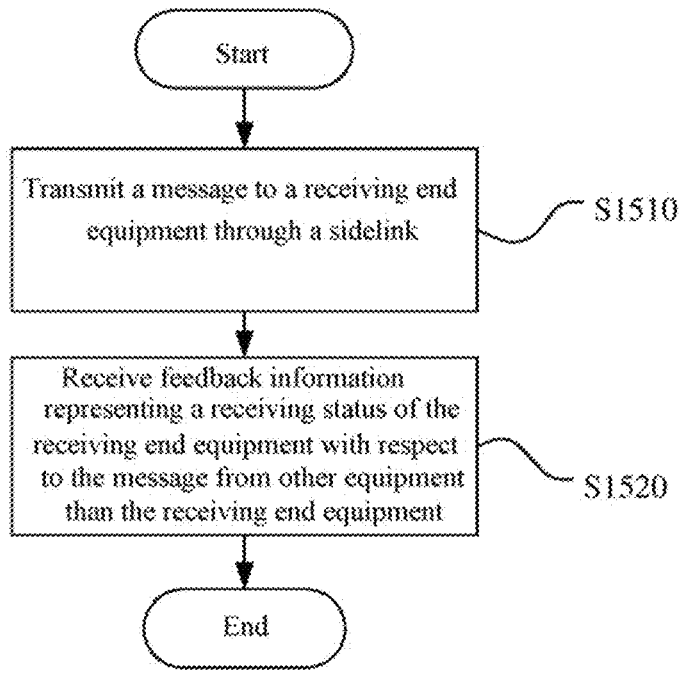
FIG. 15 is a flowchart of a wireless communication method performed by the user equipment as a transmitting end according to another embodiment of the present disclosure.
Figure 16:
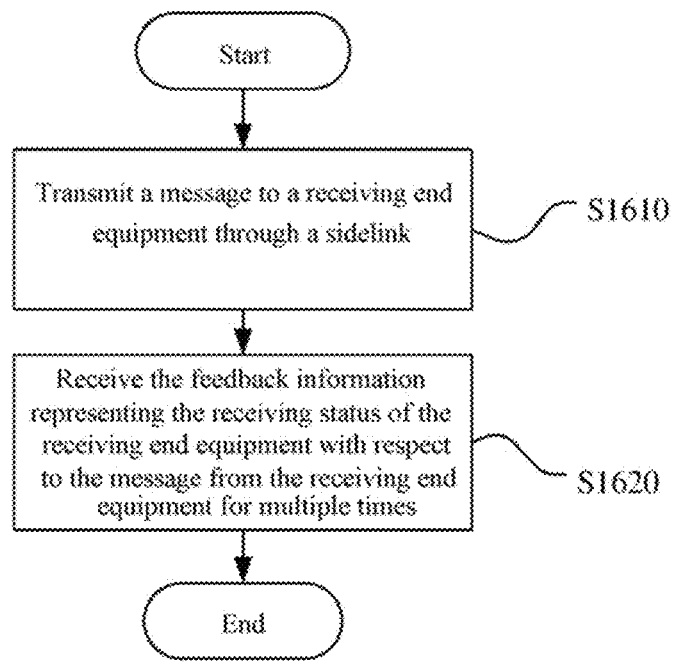
FIG. 16 is a flowchart of a wireless communication method performed by the user equipment as a receiving end according to another embodiment of the present disclosure.

Each of FIG. 15 and FIG. 16 is a flowchart of a wireless communication method performed by the user equipment 300 as a transmitting end in a wireless communication system according to an embodiment of the present disclosure.

As shown in FIG. 15, in step S1510, a message is transmitted to a receiving end equipment through a sidelink.

Next, in step S1520, feedback information representing a receiving status of the receiving end equipment with respect to the message is received from other equipment than the receiving end equipment.

Preferably, the wireless communication method further includes: transmitting scheduling information to the transmitting end equipment. The scheduling information includes identification information of the other equipment.

Preferably, the wireless communication method further includes: receiving, from the other equipment, feedback information from multiple receiving end equipments; and determining, according to the feedback information, a receiving status of each of the multiple of receiving end equipments with respect to the message.

Preferably, the wireless communication method further includes: transmitting scheduling information to the other equipment. The scheduling information includes codebook configuration information of a codebook for performing multiplexed feedback on receiving statuses of the multiple receiving end equipments.

Preferably, the wireless communication method further includes: transmitting a message to the multiple receiving end equipments in a multicast manner.

Preferably, the other equipment includes a user equipment, a road side unit and a base station equipment.

As shown in FIG. 16, in step S1610, a message is transmitted to a receiving end equipment through a sidelink.

Next, in step S1620, the feedback information representing the receiving status of the receiving end equipment with respect to the message is received from the receiving end equipment for multiple times.

Preferably, the wireless communication method further includes: transmitting scheduling information to the receiving end equipment where the scheduling information includes repeated transmission times information representing the number of times of repeated transmissions of the feedback information; and receiving the feedback information from the receiving end equipment for multiple times.

According to an embodiment of the present disclosure, the above method may be performed by the user equipment 300 according to an embodiment of the present disclosure. Therefore, all embodiments of the user equipment 300 that are described above are applicable herein.

Figure 17:
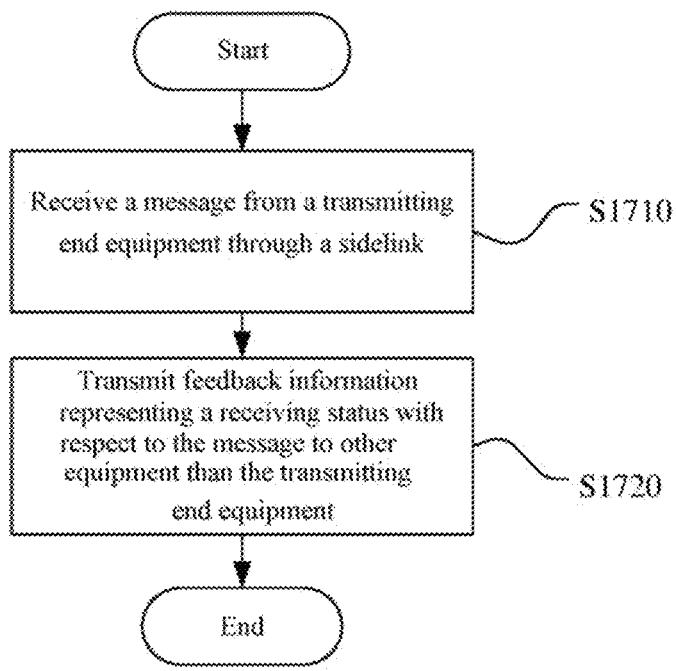
FIG. 17 is a flowchart of a wireless communication method performed by the user equipment as a transmitting end according to another embodiment of the present disclosure.
Figure 18:
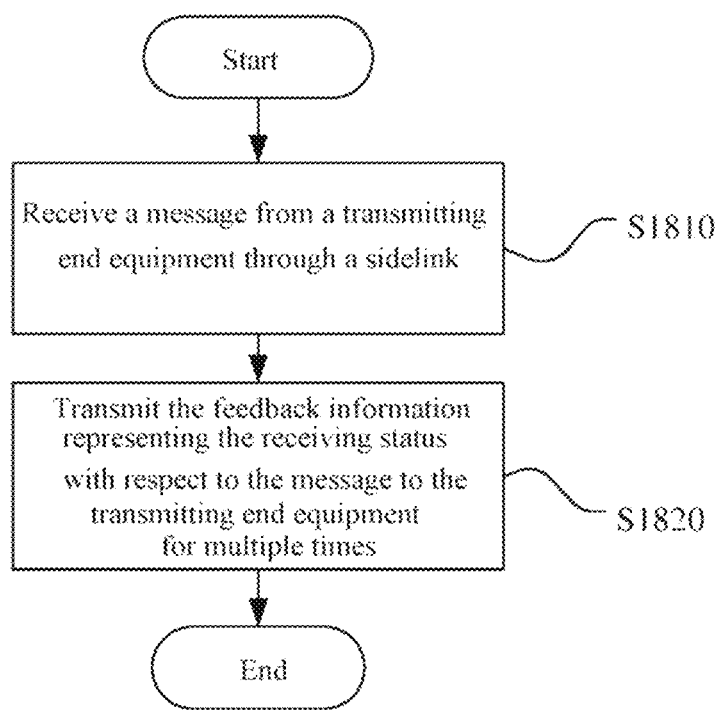
FIG. 18 is a flowchart of a wireless communication method performed by the user equipment as a receiving end according to another embodiment of the present disclosure.

Each of FIG. 17 and FIG. 18 is a flowchart of a wireless communication method performed by the user equipment 1000 as a receiving end in a wireless communication system according to an embodiment of the present disclosure.

As shown in FIG. 17, in step S1710, a message is received from a transmitting end equipment through a sidelink.

Next, in step S1720, feedback information representing a receiving status of the user equipment with respect to the message is transmitted to other equipment than the transmitting end equipment.

Preferably, the wireless communication method further includes: receiving scheduling information from the transmitting end equipment; and determining the other equipment according to identification information of the other equipment included in the scheduling information.

Preferably, the other equipment includes a user equipment, a road side unit and a base station equipment.

As shown in FIG. 18, in step S1810, a message is received from a transmitting end equipment through a sidelink.

Next, in step S1820, the feedback information representing the receiving status of the user equipment with respect to the message is transmitted to the transmitting end equipment for multiple times.

Preferably, the wireless communication method further includes: receiving scheduling information from the transmitting end equipment; determining the number of times of repeated transmissions of the feedback information according to repeated transmission times information included in the scheduling information; and transmitting the feedback information to the transmitting end equipment for multiple times.

According to an embodiment of the present disclosure, the above method may be performed by the user equipment 1000 according to an embodiment of the present disclosure. Therefore, all embodiments of the user equipment 1000 that are described above are applicable herein.

In addition, a wireless communication method performed by the user equipment 300 as a transmitting end in a wireless communication system is provided according to the present disclosure. The method includes: transmitting scheduling information to a receiving end equipment through a sidelink. The scheduling information includes feedback type indication information of a message transmitted by the user equipment to the receiving end equipment. The feedback type indication information indicates at least one of: do not feed a receiving status with respect to the message back; only feed ACK back; only feed NACK back; and determine whether to feed ACK or NACK back according to the receiving status with respect to the message.

The technology according to the present disclosure is applicable to various products.

The network side equipment may be implemented as any types of TRP. The TRP may have a function of transmitting and receiving. For example, the TRP may receive information from a user equipment and a base station equipment and may further transmit information to a user equipment and a base station equipment. In an example, the TRP may serve a user equipment and may be controlled by a base station equipment. In addition, the TRP may have a structure similar to that of a base station equipment described below or only have a structure related to information transmitting and receiving in the base station equipment.

The network side equipment may be implemented as any types of base station equipment, such as a macro eNB and a small eNB. The network side equipment may further be implemented as any types of gNB (a base station in a 5G system). The small eNB may be an eNB of a cell having a smaller coverage than a macro cell, such as a pico eNB, a micro eNB and a home (femto) eNB. Alternatively, the base station may be implemented as any other types of base stations, such as a NodeB and a base transceiver station (BTS). The base station may include: a main body (also referred to as a base station equipment) configured to control the wireless communication; and one or more remote radio heads (RRH) arranged at a different position from the main body.

The user equipment may be implemented as a mobile terminal (such as a smartphone, a tablet personal computer (PC), a notebook PC, a portable game terminal, a portable/dongle mobile router and a digital camera) or a vehicle terminal (such as a vehicle navigation equipment). The user equipment may further be implemented as a terminal performing machine to machine (M2M) communications (which is also referred to as a machine type communication (MTC) terminal). In addition, the user equipment may further be a wireless communication module (such as an integrated circuitry module including one wafer) mounted on each of the above terminals. In addition, the user equipment may be implemented as a vehicle.

Figure 19:
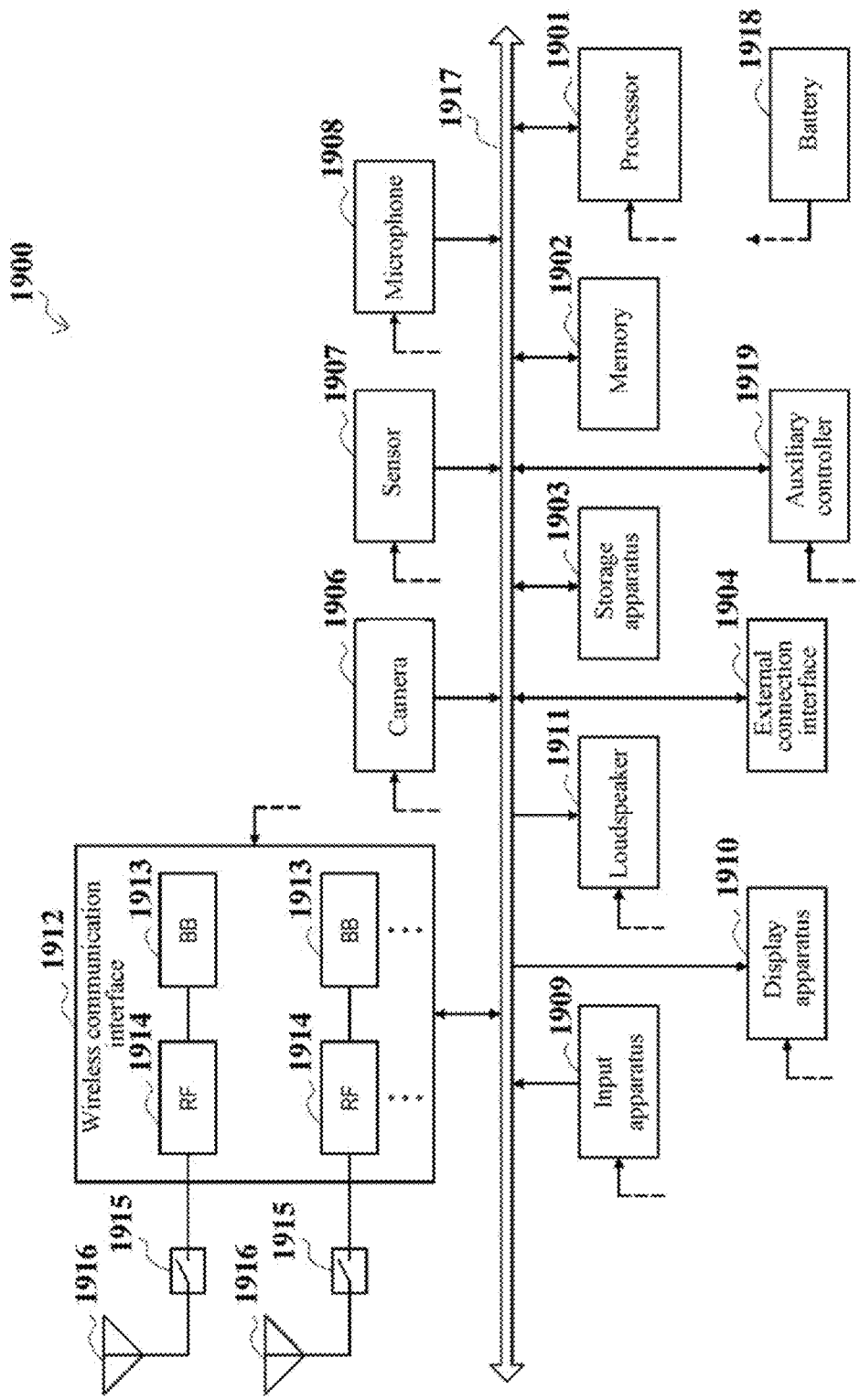
FIG. 19 is a block diagram showing exemplary configuration of a smartphone.

FIG. 19 is a block diagram showing an exemplary configuration of a smartphone 1900 to which technology according to the present disclosure may be applied. The smartphone 1900 includes a processor 1901, a memory 1902, a storage apparatus 1903, an external connection interface 1904, a camera 1906, a sensor 1907, a microphone 1908, an input apparatus 1909, a display apparatus 1910, a loudspeaker 1911, a wireless communication interface 1912, one or more antenna switches 1915, one or more antennas 1916, a bus 1917, a battery 1918 and an auxiliary controller 1919.

The processor 1901 may be, for example, a CPU or a system on chip (SoC), and controls functions of an application layer and another layer of the smartphone 1900. The memory 1902 includes an RAM and an ROM, and stores data and a program executed by the processor 1901. The storage apparatus 1903 may include a storage medium such as a semiconductor memory and a hard disk. The external connection interface 1904 is an interface for connecting an external apparatus (such as a memory card and a universal serial bus (USB) apparatus) to the smartphone 1900.

The camera 1906 includes an image sensor (such as a charge coupled device (CCD) and a complementary metal oxide semiconductor (CMOS)), and generates a captured image. The sensor 1907 may include a group of sensors such as a measurement sensor, a gyro sensor, a geomagnetic sensor, and an acceleration sensor. The microphone 1908 converts sound that is inputted to the smartphone 1900 into an audio signal. The input apparatus 1909 includes, for example, a touch sensor configured to detect a touch on a screen of the display apparatus 1910, a keypad, a keyboard, a button, or a switch, and receives an operation or information inputted from a user. The display apparatus 1910 includes a screen (such as a liquid crystal display (LCD) and an organic light-emitting diode (OLED) display), and displays an output image of the smartphone 1900. The loudspeaker 1911 is configured to convert an audio signal outputted from the smartphone 1900 into sound.

The wireless communication interface 1912 supports any cellular communication scheme (such as LTE and LTE-Advanced), and performs wireless communications. The wireless communication interface 1912 may include, for example, a BB processor 1913 and RF circuitry 1914. The BB processor 1913 may perform, for example, coding/decoding, modulating/demodulating and multiplexing/demultiplexing, and perform various types of signal processing for wireless communications. The RF circuitry 1914 may include, for example, a mixer, a filter and an amplifier, and sends and receives a wireless signal via an antenna 1916. The wireless communication interface 1912 may be a chip module having the BB processor 1913 and the RF circuitry 1914 integrated thereon. As shown in FIG. 19, the wireless communication interface 1912 may include multiple BB processors 1913 and multiple RF circuitry 1914. Although FIG. 19 shows an example in which the wireless communication interface 1912 includes the multiple BB processors 1913 and the multiple RF circuitry 1914, the wireless communication interface 1912 may include a single BB processor 1913 or single RF circuitry 1914.

Besides the cellular communication scheme, the wireless communication interface 1912 may support an additional type of wireless communication scheme, such as a short-distance wireless communication scheme, a near field communication scheme and a wireless local area network (LAN) scheme. In this case, the wireless communication interface 1912 may include the BB processor 1913 and the RF circuitry 1914 for each wireless communication scheme.

Each of the antenna switches 1915 switches a connection destination of the antenna 1916 among multiple circuitry (such as circuitry for different wireless communication schemes) included in the wireless communication interface 1912.

Each of the antennas 1916 includes a single antenna element or multiple antenna elements (such as multiple antenna elements included in an MIMO antenna), and is used for the wireless communication interface 1912 to send and receive a wireless signal. The smartphone 1900 may include multiple antennas 1916, as shown in FIG. 19. Although FIG. 19 shows an example in which the smartphone 1900 includes the multiple antennas 1916, the smartphone 1900 may also include a single antenna 1916.

In addition, the smartphone 1900 may include an antenna 1916 for each type of wireless communication scheme. In this case, the antenna switches 1915 may be omitted from the configuration of the smartphone 1900.

The processor 1901, the memory 1902, the storage apparatus 1903, the external connection interface 1904, the camera 1906, the sensor 1907, the microphone 1908, the input apparatus 1909, the display apparatus 1910, the loudspeaker 1911, the wireless communication interface 1912, and the auxiliary controller 1919 are connected to each other via the bus 1917. The battery 1918 supplies power to blocks of the smartphone 1900 shown in FIG. 19 via feeders that are partially shown with dashed lines in the drawings. The auxiliary controller 1919, for example, operates a minimum necessary function of the smartphone 1900 in a sleep mode.

In the smartphone 1900 shown in FIG. 19, the message generation unit 310, the scheduling information generation unit 330, the determination unit 340 and the processing unit 350 that are shown in FIG. 3, and the feedback unit 1020 and the configuration unit 1030 that are shown in FIG. 10 may be implemented by the processor 1901 or the auxiliary controller 1919. At least a part of functions may also be implemented by the processor 1901 or the auxiliary controller 1919. For example, the processor 1901 or the auxiliary controller 1919 may generate a message, generate scheduling information, configure information related to scheduling, process feedback information, generate feedback information and configure information related to the feedback information by executing instructions stored in the memory 1902 or the storage apparatus 1903.

Figure 20:
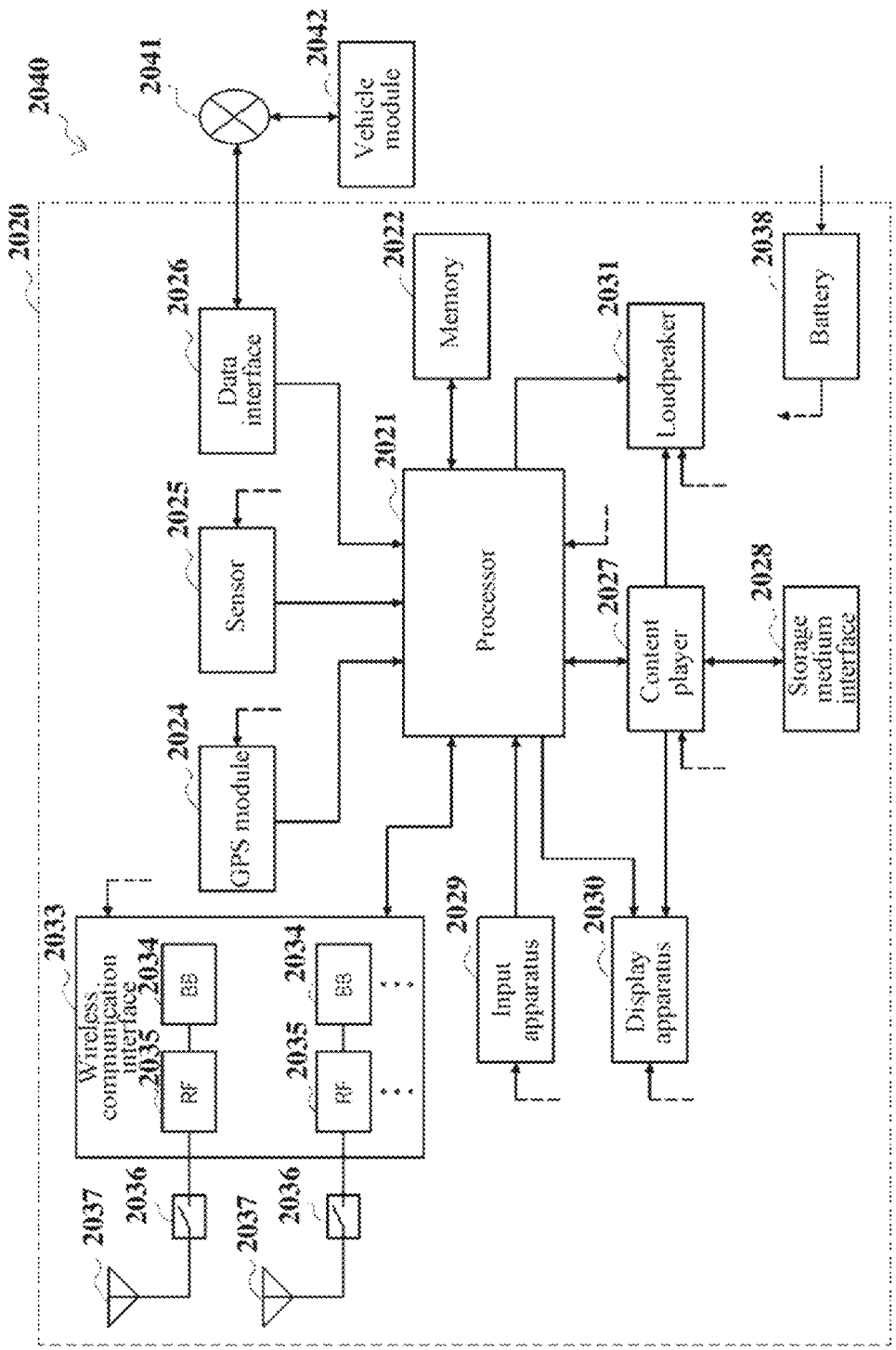
FIG. 20 is a block diagram showing exemplary configuration of a vehicle navigation equipment.

FIG. 20 is a block diagram showing an example of schematic configuration of a vehicle navigation equipment 2020 to which the technology according to the present disclosure may be applied. The vehicle navigation equipment 2020 includes a processor 2021, a memory 2022, a global positioning system (GPS) module 2024, a sensor 2025, a data interface 2026, a content player 2027, a storage medium interface 2028, an input apparatus 2029, a display apparatus 2030, a loudspeaker 2031, a wireless communication interface 2033, one or more antenna switches 2036, one or more antennas 2037, and a battery 2038.

The processor 2021 may be, for example, a CPU or a SoC, and controls a navigation function and another function of the vehicle navigation equipment 2020. The memory 2022 includes an RAM and an ROM, and stores a program executed by the processor 2021, and data.

The GPS module 2024 uses a GPS signal received from a GPS satellite to calculate a position (such as a latitude, a longitude, and an altitude) of the vehicle navigation equipment 2020. The sensor 2025 may include a group of sensors such as a gyro sensor, a geomagnetic sensor, and an air pressure sensor. The data interface 2026 is connected to, for example, a vehicle network 2041 via a terminal that is not shown, and acquires data (such as vehicle speed data) generated by the vehicle.

The content player 2027 reproduces content stored in a storage medium (such as a CD and a DVD) that is inserted into the storage medium interface 2028. The input apparatus 2029 includes, for example, a touch sensor configured to detect a touch on a screen of the display apparatus 2030, a button, or a switch, and receives an operation or information inputted by a user. The display apparatus 2030 includes a screen such as a LCD or an OLED display, and displays an image of the navigation function or reproduced content. The loudspeaker 2031 outputs sound of the navigation function or the reproduced content.

The wireless communication interface 2033 supports any cellular communication scheme (such as LTE and LTE-Advanced), and performs wireless communications. The wireless communication interface 2033 may generally include, for example, a BB processor 2034 and RF circuitry 2035. The BB processor 2034 may perform, for example, encoding/decoding, modulating/demodulating, and multiplexing/de-multiplexing, and performs various types of signal processing for wireless communications. In addition, the RF circuitry 2035 may include, for example, a mixer, a filter, and an amplifier, and sends and receives a wireless signal via the antenna 2037. The wireless communication interface 2033 may also be a chip module having the BB processor 2034 and the RF circuitry 2035 integrated thereon. The wireless communication interface 2033 may include multiple BB processors 2034 and multiple RF circuitry 2035, as shown in FIG. 20. Although FIG. 20 shows an example in which the wireless communication interface 2033 includes the multiple BB processors 2034 and the multiple RF circuitry 2035, the wireless communication interface 2033 may include a single BB processor 2034 or single RF circuitry 2035.

In addition to a cellular communication scheme, the wireless communication interface 2033 may support another type of wireless communication scheme such as a short-distance wireless communication scheme, a near field communication scheme, and a wireless LAN scheme. In that case, the wireless communication interface 2033 may include a BB processor 2034 and RF circuitry 2035 for each wireless communication scheme.

Each of the antenna switches 2036 switches a connection destination of the antenna 2037 among multiple circuitry (such as circuitry for different wireless communication schemes) included in the wireless communication interface 2033.

Each of the antennas 2037 includes a single short-distance wireless or multiple antenna elements (such as multiple antenna elements included in an MIMO antenna), and is used for the wireless communication interface 2033 to send and receive a wireless signal. The vehicle navigation equipment 2020 may include multiple antennas 2037, as shown in FIG. 20. Although FIG. 20 shows an example in which the vehicle navigation equipment 2020 includes the multiple antennas 2037, the vehicle navigation equipment 2020 may include a single antenna 2037.

Furthermore, the vehicle navigation equipment 2020 may include an antenna 2037 for each wireless communication scheme. In that case, the antenna switches 2036 may be omitted from the configuration of the vehicle navigation equipment 2020.

The battery 2038 supplies power to blocks of the vehicle navigation equipment 2020 shown in FIG. 20 via feeders that are partially shown as dashed lines in FIG. 20. The battery 2038 accumulates power supplied from the vehicle.

In the vehicle navigation equipment 2020 shown in FIG. 20, the message generation unit 310, the scheduling information generation unit 330, the determination unit 340 and the processing unit 350 that are shown in FIG. 3, and the feedback unit 1020 and the configuration unit 1030 that are shown in FIG. 10 may be implemented by the processor 2021. At least a part of functions may also be implemented by the processor 2021. For example, the processor 2021 may generate a message, generate scheduling information, configure information related to scheduling, process feedback information, generate feedback information and configure information related to the feedback information by executing instructions stored in the memory 2022.

The technology of the present disclosure may also be implemented as a vehicle system (or a vehicle) 2040 including one or more blocks in the vehicle navigation equipment 2020, the vehicle network 2041, and a vehicle module 2042. The vehicle module 2042 generates vehicle data (such as a vehicle speed, an engine speed, and fault information), and outputs the generated data to the vehicle network 2041.

Preferred embodiments of the present disclosure are described above with reference to the drawings. However, the present disclosure is not limited to the above examples. Those skilled in the art may obtain various modifications and changes within the scope of the appended claims. It should understand that these modifications and changes fall within the technical scope of the present disclosure.

For example, a unit shown with a dashed-line block in functional block diagrams shown in the drawings is optional in a corresponding apparatus. Further, optional functional units may be combined in a suitable manner to achieve required functions.

For example, in the above embodiments, multiple functions included in one unit may be achieved by separate apparatuses. Alternately, in the above embodiments, multiple functions achieved by multiple units may be achieved by separate apparatuses. In addition, one of the above functions may be achieved by multiple units. These configurations should be included in the technical scope of the present disclosure.

In this specification, the steps described in the flowcharts include not only processing performed in time series in the described order but also processing performed in parallel or individually instead of in time series. In addition, the steps performed in time series may be performed in a different order.

Although the embodiments of the present disclosure are described above in detail with reference to the drawings, it should be understood that the above-described embodiments are merely used for illustrating the present disclosure rather than intended to limit the present disclosure. Those skilled in the art can make various modifications and variations to the above-described embodiments without departing from the substance and scope of the present disclosure. Therefore, the scope of the present disclosure is defined only by the appended claims and their equivalents.

The invention claimed is:

1. A user equipment configured to operate as a transmitting end, the user equipment comprising:
processing circuitry configured to:
determine feedback type information;
transmit scheduling information to a receiving end equipment, the scheduling information comprising the feedback type information;
transmit a message to the receiving end equipment through a sidelink; and
receive feedback information from the receiving end equipment in accordance with the feedback type information,
wherein the feedback type information is selectable from:
a first feedback type information representing that the receiving end equipment is prohibited from providing the feedback information corresponding to a situation where the message is received (ACK) by the receiving end equipment and is required to provide the feedback information corresponding to a situation where the message is not received (NACK) by the receiving end equipment, and
a second feedback type information representing that the receiving end equipment is required to provide the feedback information corresponding to the situation where the message is received (ACK) by the receiving end equipment and is required to provide the feedback information corresponding to the situation where the message is not received (NACK) by the receiving end equipment.

2. The user equipment according to claim 1,
wherein the scheduling information further comprises time information representing a feedback time for the feedback information and resource information representing resources used by the feedback information, and
wherein the feedback information is received according to the time information and the resource information.

3. The user equipment according to claim 1,
wherein the scheduling information further comprises codeblock group (CBG) information related to a CBG to which the message relates, and
wherein the feedback information is feedback information for the CBG.

4. The user equipment according to claim 1,
wherein the scheduling information further comprises a partial feedback indicator representing that the receiving end equipment performs feedback only with respect to a receiving status of a part of the message, and
wherein the feedback information is feedback information only for the part of the message.

5. The user equipment according to claim 1,
wherein the scheduling information further comprises a partial feedback indicator representing that the receiving end equipment performs feedback only with respect to one transport block (TB) of a plurality of TBs or one codeblock group (CBG) of a plurality of CBGs, and
wherein the feedback information is feedback information only for the one TB or the one CBG.

6. The user equipment according to claim 1,
wherein the scheduling information further comprises codebook configuration information of a codebook for the receiving end equipment to perform a multiplexed feedback on receiving statuses with respect to each of a plurality of transport blocks (TBs),
wherein the feedback information comprises feedback information for each of the plurality of TBs.

7. The user equipment according to claim 1,
wherein the scheduling information further comprises codebook configuration information of a codebook for a plurality of receiving end equipment to perform multiplexed feedback on a receiving status with respect to one or more transport blocks (TBs), and
wherein the feedback information comprises multiplexed feedback information for the one or more transport blocks TBs of the plurality of receiving end equipment.

8. The user equipment according to claim 1,
wherein the scheduling information further comprises repeated transmission times information representing a number of times of repeated transmissions of the feedback information, and
wherein the feedback information comprises feedback information that is repeated for a plurality of times corresponding to the number of times of repeated transmissions.

9. The user equipment according to claim 1,
wherein the scheduling information further comprises identification information for another equipment to which the receiving end equipment is to use as a relay for the feedback information, and
wherein the feedback information comprises feedback information received from the other equipment.

10. The user equipment according to claim 1, wherein the scheduling information further comprises Hybrid Automatic Repeat Request (HARQ) indication information indicating whether current scheduling supports a HARQ protocol.

11. A user equipment configured to operate as a receiving end, the user equipment comprising:
processing circuitry configured to:
receive scheduling information from a transmitting end equipment, the scheduling information comprising feedback type information;
receive a message from the transmitting end equipment through a sidelink; and
transmit feedback information to the transmitting end equipment in accordance with the feedback type information, wherein
when the feedback type information is a first feedback type information, the user equipment is prohibited from providing the feedback information corresponding to a situation where the message is received (ACK) by the user equipment and is required to provide the feedback information corresponding to a situation where the message is not received (NACK) by the user equipment, and
when the feedback type information is a second feedback type information, the user equipment is required to provide the feedback information corresponding to the situation where the message is received (ACK) by the user equipment and is required to provide the feedback information corresponding to the situation where the message is not received (NACK) by the user equipment.

12. The user equipment according to claim 11,
wherein the scheduling information further comprises time information representing a feedback time for the feedback information and resource information representing resources used by the feedback information, and
wherein the feedback information is transmitted according to the time information and the resource information.

13. The user equipment according to claim 11,
wherein the scheduling information further comprises codeblock group (CBG) information related to a CBG to which the message relates, and
wherein the feedback information is feedback information for the CBG.

14. The user equipment according to claim 11,
wherein the scheduling information further comprises a partial feedback indicator representing that the user equipment performs feedback only with respect to a receiving status of a part of the message, and
wherein the feedback information is feedback information only for the part of the message.

15. The user equipment according to claim 11,
wherein the scheduling information further comprises codebook configuration information of a codebook for the user equipment to perform a multiplexed feedback on receiving statuses with respect to each of a plurality of transport blocks (TBs),
wherein the feedback information comprises feedback information for each of the plurality of transport blocks (TBs).

16. The user equipment according to claim 11,
wherein the scheduling information further comprises codebook configuration information of a codebook for a plurality user equipment to perform multiplexed feedback on a receiving status with respect to one or more transport blocks (TBs), and
wherein the feedback information comprises multiplexed feedback information for the one or more transport blocks TBs of the plurality of user equipment.

17. The user equipment according to claim 11,
wherein the scheduling information further comprises repeated transmission times information representing a number of times of repeated transmissions of the feedback information, and
wherein the feedback information comprises feedback information that is repeated for a plurality of times corresponding to the number of times of repeated transmissions.

18. The user equipment according to claim 11,
wherein the scheduling information further comprises identification information for another user equipment to which the user equipment is to use as a relay for the feedback information, and
wherein the feedback information comprises feedback information transmitted to transmitting end equipment via the other equipment.

19. The user equipment according to claim 11,
wherein the scheduling information further comprises a partial feedback indicator representing that the receiving end equipment performs feedback only with respect to one transport block (TB) of a plurality of TBs or one codeblock group (CBG) of a plurality of CBGs, and
wherein the feedback information is feedback information only for the one TB or the one CBG.

20. A wireless communication method performed by a user equipment configured to operate as a transmitting end, the method comprising:
determining feedback type information;
transmitting scheduling information to a receiving end equipment, the scheduling information comprising the feedback type information;
transmitting a message to the receiving end equipment through a sidelink; and
receiving feedback information from the receiving end equipment in accordance with the feedback type information,
wherein the feedback type information is selectable from:
a first feedback type information representing that the receiving end equipment is prohibited from providing the feedback information corresponding to a situation where the message is received (ACK) by the receiving end equipment and is required to provide the feedback information corresponding to a situation where the message is not received (NACK) by the receiving end equipment, and
a second feedback type information representing that the receiving end equipment is required to provide the feedback information corresponding to the situation where the message is received (ACK) by the receiving end equipment and is required to provide the feedback information corresponding to the situation where the message is not received (NACK) by the receiving end equipment.

* * * * *